(12) United States Patent
McNutt

(10) Patent No.: US 9,728,302 B1
(45) Date of Patent: Aug. 8, 2017

(54) FLAME RETARDANT COMMUNICATION CABLES INCORPORATING EXTINGUISHANTS

(71) Applicant: Superior Essex International LP, Atlanta, GA (US)

(72) Inventor: Christopher W. McNutt, Woodstock, GA (US)

(73) Assignee: Superior Essex International IP, Atlanta, GA (US)

( * ) Notice: Subject to any disclaimer, the term of this patent is extended or adjusted under 35 U.S.C. 154(b) by 0 days.

(21) Appl. No.: 15/281,603

(22) Filed: Sep. 30, 2016

(51) Int. Cl.
| | |
|---|---|
| *G02B 6/44* | (2006.01) |
| *H01B 7/295* | (2006.01) |
| *H01B 11/02* | (2006.01) |
| *H01B 7/18* | (2006.01) |
| *H01B 11/10* | (2006.01) |

(52) U.S. Cl.
CPC ............ *H01B 7/295* (2013.01); *G02B 6/441* (2013.01); *G02B 6/4434* (2013.01); *G02B 6/4436* (2013.01); *H01B 7/185* (2013.01); *H01B 11/02* (2013.01); *H01B 11/10* (2013.01)

(58) Field of Classification Search
None
See application file for complete search history.

(56) References Cited

U.S. PATENT DOCUMENTS

| | | | | |
|---|---|---|---|---|
| 4,458,105 A | * | 7/1984 | Roenisch | H01B 7/285 156/56 |
| 4,547,626 A | * | 10/1985 | Pedersen | G02B 6/4416 174/107 |
| 6,049,647 A | * | 4/2000 | Register | G02B 6/4416 385/100 |
| 6,236,791 B1 | * | 5/2001 | Lausch | G02B 6/4436 385/109 |
| 6,278,826 B1 | * | 8/2001 | Sheu | G02B 6/4494 385/102 |
| 9,316,801 B1 | * | 4/2016 | Kithuka | G02B 6/4495 |
| 2003/0103742 A1 | * | 6/2003 | Auvray | G02B 6/4436 385/109 |
| 2005/0199415 A1 | * | 9/2005 | Glew | G02B 6/4429 174/113 C |
| 2007/0209823 A1 | * | 9/2007 | Vexler | H01B 11/06 174/113 C |
| 2009/0314514 A1 | * | 12/2009 | Galletti | H01B 7/295 174/110 A |

FOREIGN PATENT DOCUMENTS

| | | | |
|---|---|---|---|
| EP | 0237440 A2 | * | 9/1987 |
| JP | 62-87913 A | * | 4/1987 |

\* cited by examiner

*Primary Examiner* — Mike Stahl

(57) ABSTRACT

Flame retardant communications cables may include at least one transmission media and at least one other component, such as a separator, buffer tube, jacket, shield layer, or wrap. The at least one other component may include a body portion, and at least one cavity formed in the body portion in which an extinguishant is positioned. Additionally, the at least one transmission media is not positioned within the at least one cavity.

20 Claims, 10 Drawing Sheets

FLAME RETARDANT COMMUNICATION CABLES INCORPORATING EXTINGUISHANTS

TECHNICAL FIELD

Embodiments of the disclosure relate generally to communication cables and, more particularly, to flame retardant communication cables incorporating one or more components that include extinguishants.

BACKGROUND

A wide variety of different types of communication cables are utilized to transmit information. These cables include, for example, twisted pair cables, optical fiber cables, coaxial cables, and a wide variety of hybrid cables that incorporate multiple types of transmission elements. Communication cables are often deployed in applications involving fire performance considerations. For example, cables intended for installation in a plenum space typically must satisfy burn and smoke performance standards. Additionally, it is desirable to limit flame propagation along the length of a cable, especially a cable installed horizontally in a plenum space. An opportunity exist for improved communication cables that limit flame propagation and/or that exhibit improved burn performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
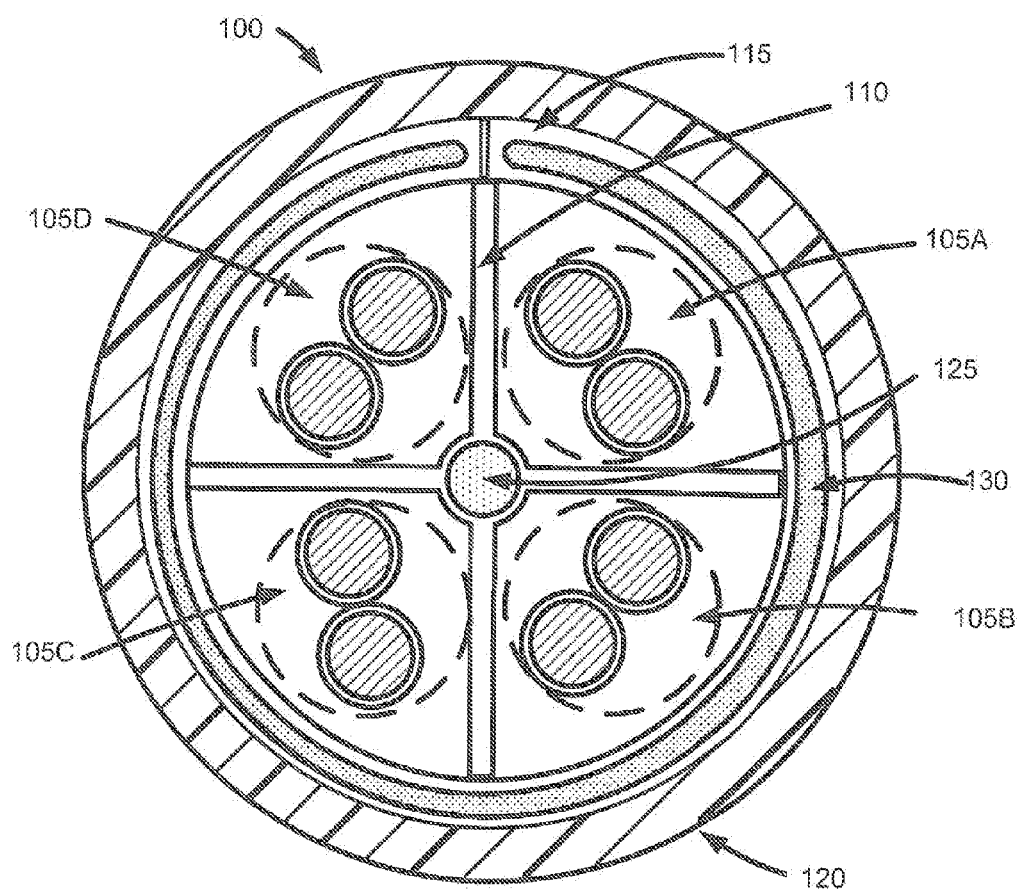
FIGS. 1-2 are cross-sectional views of example twisted pair cables that each include at least one component incorporating an extinguishant in order to improve flame performance, according to illustrative embodiments of the disclosure.

Various embodiments of the present disclosure are directed to cable components that include one or more cavities in which an extinguishant is positioned, as well as cables that incorporate such cable components. In one example embodiment, a cable may include at least one transmission element or transmission media (e.g., one or more optical fibers, one or more twisted pairs of conductors, etc.) and at least one component that incorporates an extinguishant. The at least one component may include a body portion, and at least one cavity may be formed in the body portion. The extinguishant may be positioned or situated within the at least one cavity. According to an aspect of the disclosure, the transmission element(s) may be situated outside of the one or more cavities that house extinguishant. In other words, the extinguishant may be maintained separately from the transmission element(s) within the cable such that the extinguishant does not contact the transmission element(s) absent a penetration, rupture, or other opening of a cavity in which the extinguishant is situated.

As set forth in greater detail below with reference to FIGS. 1-3, a wide variety of different types of cable components may be formed with one or more cavities in which extinguishant may be positioned. A few non-limiting examples of components that may be formed include twisted pair separators, cable wraps, shield layers, optical fiber buffer tubes, microtubes, spacers or fillers, central strength members, inner and/or outer cable jackets, etc. Additionally, these components may be utilized in a wide variety of different types of cables including, but not limited to, optical fiber cables, twisted pair cables, hybrid or composite cables (e.g., cables including a combination of conductors and optical fibers), other communication cables, plenum cables, riser cables, outside plant cables, etc.

A component may be formed with any number of cavities as desired in various embodiments. Additionally, a cavity may be formed with a wide variety of suitable dimensions, such as any suitable longitudinal length, width, and/or cross-sectional area. A wide variety of suitable extinguishants may be positioned or situated within a cavity. For purposes of this disclosure, an extinguishant may be an agent that extinguishes fire. In certain embodiments, an extinguishant may include solid material, such as solid powders, particles, fragments, spheres, and/or other materials. Examples of suitable extinguishants include, but are not limited to, aluminum trihydrate, magnesium hydroxide, monoammonium phosphate, halogenated flame retardants, antimony oxides, organophosphorus, phosphate esters, etc. As desired, nanomaterials and/or other additives, such as nanoclays and/or carbon nanotubes, may be used in conjunction with flame retardant powders to improve or enhance their performance.

A wide variety of suitable methods or techniques may be utilized to form a component with one or more cavities in which extinguishant is positioned. In certain embodiments, a first section of a component may be extruded such that it includes indentations, pools, or other areas into which extinguishant may be positioned. Once extinguishant has been situated within the first section, a second section of the component may be extruded onto the first section such that the extinguishant is encapsulated within one or more cavities corresponding to the indentations. In other embodiments, two layers of a component may be selectively affixed (e.g., adhered, ultrasonically welded, etc.) to one another such that one or more cavities in which extinguishant is positioned are defined.

As a result of incorporating an extinguishant into one or more cable components, the flame retardant capabilities and/or flame performance of a cable may be enhanced. In the event that the cable is exposed to a fire or flame event, the fire or flame may rupture or penetrate any number of the cavities incorporated into the cable components. The extinguishant contained therein may then interact with the fire and assist in extinguishing the fire and/or limiting its propagation along the longitudinal length of the cable.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
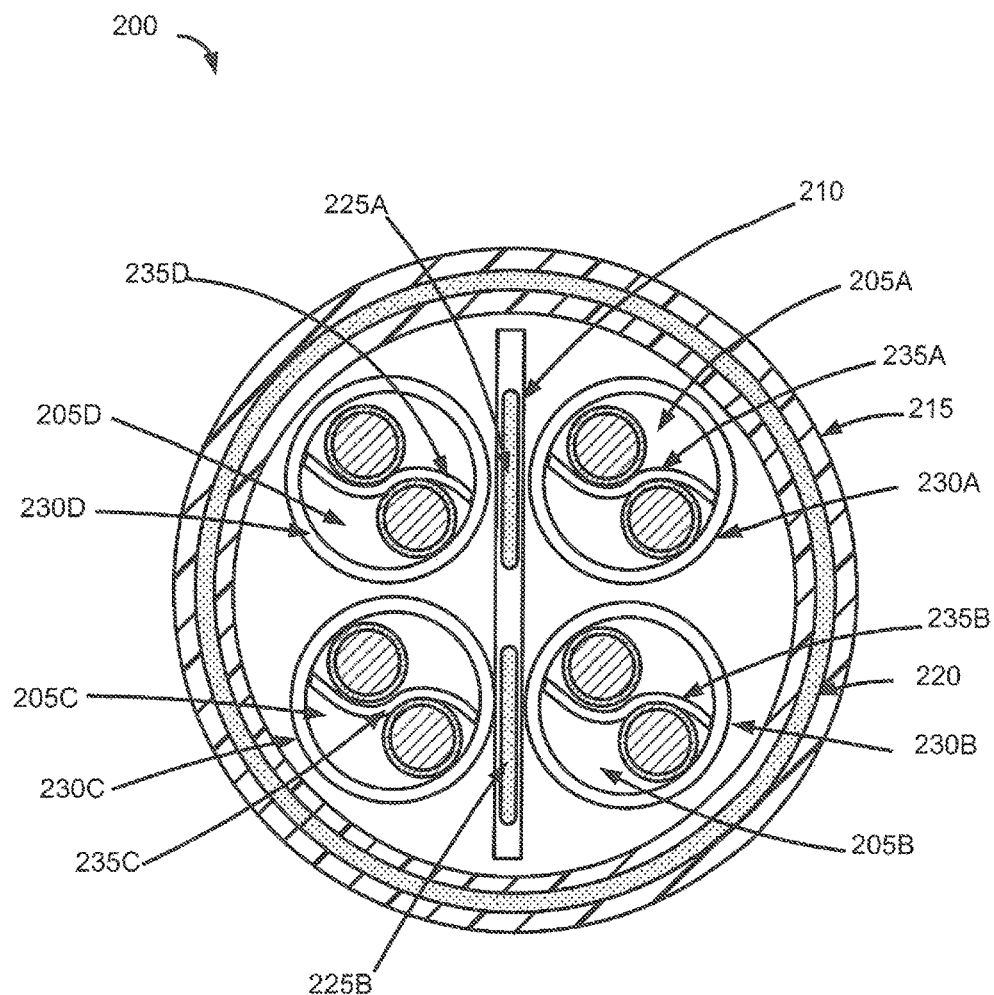
Figure 3:
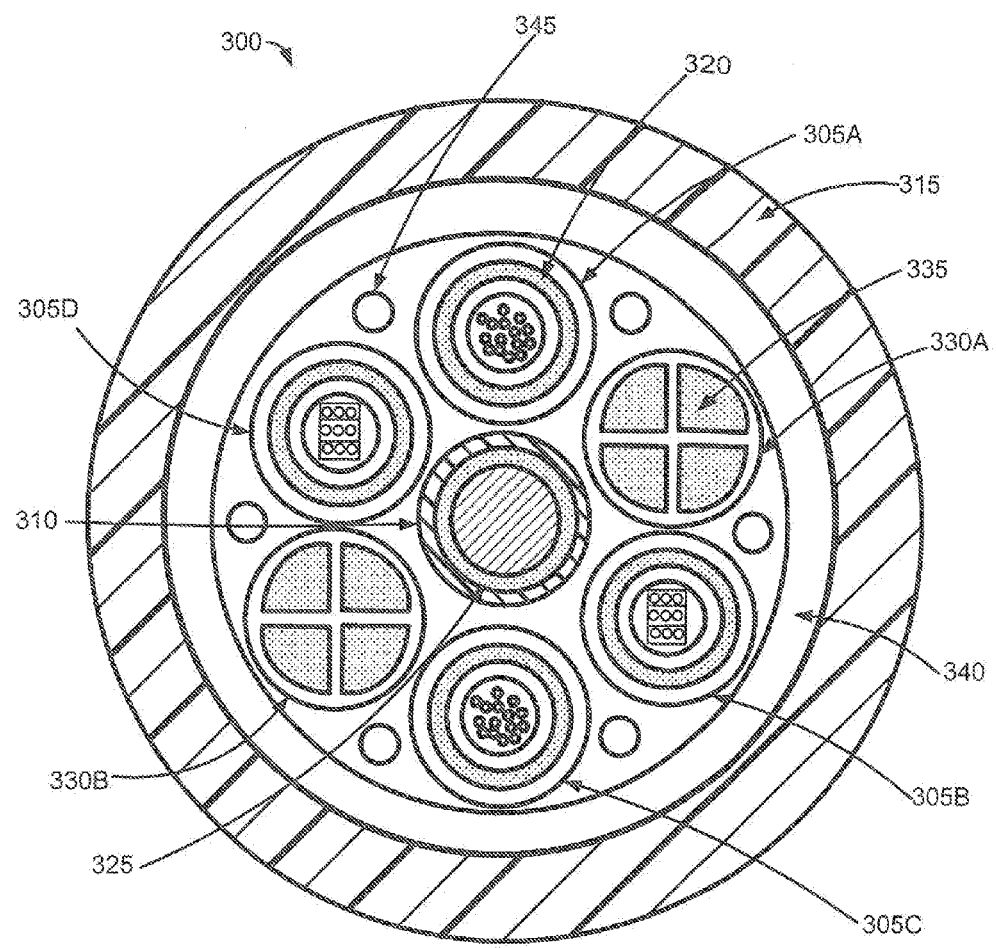
FIG. 3 is a cross-sectional view of an example optical fiber cable that includes at least one component incorporating an extinguishant in order to improve flame performance, according to an illustrative embodiment of the disclosure.

FIGS. 1-3 illustrate example cable constructions in which one or more cable components may be formed to include one or more cavities in which extinguishant is situated. A wide variety of example components are described with reference to FIGS. 1-3; however, it will be appreciated that a cable may be formed with any number of components that include extinguishant positioned within one or more cavities. The disclosure is not intended to be limited to the specific combinations of components illustrated in FIGS. 1-3. Additionally, the described cables are provided by way of non-limiting example only, and it will be appreciated that a wide variety of other suitable cable components and/or cable constructions may be formed in addition to those described. Further, a wide variety of other cable constructions, such as composite or hybrid cables, may incorporate components having extinguishant positioned in one or more cavities. Suitable cables may also include any number of transmission media including, but not limited to, one or more twisted pairs, optical fibers, coaxial cables, and/or power conductors.

Turning now to FIG. 1, a cross-sectional view of an example twisted pair cable 100 is illustrated. The cable 100 may include a plurality of twisted pairs, such as the illustrated four twisted pairs 105A, 105B, 105C, 105D. A separator 110 or filler may be positioned between at least two of the twisted pairs. In certain embodiments, one or more suitable shield layers, such as an external shield 115 may also be incorporated into the cable 100. An outer jacket 120 may then be formed around the twisted pairs and the other cable components. As shown in FIG. 1, the separator 110 and the shield 115 may each include one or more cavities in which extinguishant is positioned. In other embodiments, other components and/or combinations of components may include one or more cavities with extinguishant. Each of the illustrated components is described in greater detail below.

Although the cable 100 is illustrated as having four twisted pairs 105A, 105B, 105C, 105D, any other suitable number of pairs may be utilized. As desired, the twisted pairs 105A-D and/or various groupings of twisted pairs may be twisted or bundled together and/or suitable bindings may be wrapped around the twisted pairs 105A-D. Each twisted pair (referred to generally as twisted pair 105 or collectively as twisted pairs 105) may include two electrical conductors, each covered with suitable insulation. Each twisted pair 105 can carry data or some other form of information, for example in a range of about one to ten Giga bits per second ("Gbps") or another appropriate frequency, whether faster or slower. Each of the twisted pairs may have any suitable twist lay length and, in various embodiments, twisted pairs may be formed with similar or different lay lengths.

The electrical conductors of a twisted pair 105 may be formed from any suitable electrically conductive material, such as copper, aluminum, silver, annealed copper, gold, a conductive alloy, etc. Additionally, the electrical conductors may have any suitable diameter, gauge, and/or other dimensions. Further, each of the electrical conductors may be formed as either a solid conductor or as a conductor that includes a plurality of conductive strands. The twisted pair insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, chlorosulfonated polyethylene, flame retardant PVC, low temperature oil resistant PVC, flame retardant polyurethane, flexible PVC, or a combination of any of the above materials. In certain embodiments, the insulation may be formed from multiple layers of one or a plurality of suitable materials. In other embodiments, the insulation may be formed from one or more layers of foamed material. Additionally, in certain embodiments, the insulation of each of the electrical conductors utilized in the twisted pairs 105A-D may be formed from similar materials. In other embodiments, at least two of the twisted pairs may utilize different insulation materials. In yet other embodiments, the two conductors that make up a twisted pair may utilize different insulation materials.

The jacket 120 may enclose the internal components of the cable 100, seal the cable 100 from the environment, and provide strength and structural support. Similar to the twisted pair insulation, the jacket 120 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers. MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, chlorosulfonated polyethylene, flame retardant PVC, low temperature oil resistant PVC, flame retardant polyurethane, flexible PVC, or a combination of any of the above materials. The jacket 120 may be formed as a single layer or, alternatively, as multiple layers. In certain embodiments, the jacket 120 may be formed from one or more layers of foamed material. As explained in greater detail below with reference to FIG. 2, the jacket 120 may be formed to include one or more cavities in which extinguishant is positioned. Additionally, the jacket 120 may include a wide variety of suitable shapes (e.g., cross-sectional shape such as the illustrated round jacket) and/or dimensions (e.g., inner diameter, outer diameter, thickness, etc.). In various embodiments, the jacket 120 can be characterized as an outer jacket, an outer sheath, a casing, a circumferential cover, or a shell.

An opening enclosed by the jacket 120 may be referred to as a cable core, and the twisted pairs 105 and other internal components may be disposed within the cable core. Although a single cable core is illustrated in FIG. 1, a cable may be formed to include multiple cable cores. In certain embodiments, a cable core may be filled with a gas such as air (as illustrated) or alternatively a gel, solid, powder, moisture absorbing material, water-swellable substance, dry filling compound, or foam material, for example in interstitial spaces between the twisted pairs 105A-D. Other elements can be added to the cable core as desired, for example one or more optical fibers, additional electrical conductors, additional twisted pairs, water absorbing materials, and/or strength members, depending upon application goals.

The separator 110 or filler may be disposed within the cable core and configured to orient and or position one or more of the twisted pairs 105A-D. The orientation of the twisted pairs 105A-D relative to one another may provide beneficial signal performance. Additionally, in various embodiments, the separator 110 may include one or more cavities 125 in which an extinguishant is positioned. As shown in FIG. 1, in certain embodiments, one or more cavities 125 may be positioned proximate to the cross-sectional center of the separator 110, and each of the one or more cavities 125 may have any suitable longitudinal length. In other words, one or more cavities 125 may be spaced along a longitudinal length of the separator 110. As explained in greater detail below, other separator constructions may include any other suitable number and/or arrangement of cavities.

The separator 110 may be formed in accordance with a wide variety of suitable dimensions, shapes, or designs. The separator 110 illustrated in FIG. 1 has an approximately cross-shaped cross-section. As other examples, a rod-shaped or circular separator, a flat separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. A few example cross-sectional shapes that may be utilized for separators are described in greater detail below with reference to FIGS. 5A-5H.

Additionally, in certain embodiments, a cross-sectional shape of the separator 100 may be expanded or modified relative to a conventional cross-sectional shape (e.g., an X-shape, etc.) in order to accommodate one or more cavities 125. For example, the separator 110 of FIG. 1 has a cross-sectional shape that is approximately an "X" or cross. A central portion of the separator 110 is expanded or modified in order to accommodate the one or more cavities 125. In other words, one or more cross-sectional dimensions of the separator body may be expanded or otherwise modified based at least in part on the size and/or other dimensions of the cavities 125. Indeed, any of the cross-sectional shaped discussed above, as well as a wide-variety of other shapes may be modified in order to accommodate one or more cavities. In other embodiments, one or more cavities may be formed without exaggerating or otherwise modifying a cross-sectional shape of the separator.

In certain embodiments, a separator 110 may be formed from a single segment or portion. In other words, the separator 110 may be formed as a relatively continuous separator along a longitudinal length of the cable 100. In other embodiments, a separator 110 may be formed from a plurality of discrete or severed segments or portions. For example, discrete segments or portions may be positioned adjacent to one another along a longitudinal length of the separator 110. In certain embodiments, gaps or spaces may be present between various segments or portions of the separator 110. In other embodiments, at least a portion of the segments may be arranged in an overlapping configuration.

As desired, the separator 110 may have a body formed from a wide variety of suitable materials and/or combinations of materials. For example, the a body portion of a separator 110 and/or various separator segments can include paper, metals, alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, chlorosulfonated polyethylene, flame retardant PVC, low temperature oil resistant PVC, flame retardant polyurethane, flexible PVC, one or more dielectric shielding materials (e.g., barium ferrite, etc.) or any other suitable material or combination of materials. In certain embodiments, the separator 110 may have a relatively flexible body. As desired, the separator 110 may be foamed, un-foamed, homogeneous, or inhomogeneous and may or may not include additives (e.g., flame retardant, smoke suppressant materials, strength members, etc.).

For a segmented separator formed from a plurality of discrete segments, the various portions or segments of the separator 110 may include a wide variety of different lengths and/or sizes. As desired, various segments may have common lengths or two or more portions may have different lengths. Varying or different lengths may be formed in accordance with an established pattern or in a random or pseudo-random manner. Additionally, various segments of the separator 110 may be formed from similar materials or, alternatively, at least two segments may be formed from different materials. For example, a separator 110 may make use of alternating materials and/or combinations of materials in adjacent portions.

A wide variety of suitable methods or techniques may be utilized as desired in order to form a separator 110 or various segments of a separator 110. In certain embodiments, material may be extruded, pultruded, or otherwise formed through one or more dies and/or via any number of other suitable extrusion techniques in order to obtain a desired cross-sectional shape. As explained in greater detail below with reference to FIGS. 6A-C, a multi-step extrusion process may be utilized in order to form one or more cavities 125 that include extinguishant. In other embodiments, material may be cast or molded into a desired shape to form the separator 110. In yet other embodiments, one or more tapes may be formed into desired shapes and/or combined together in order to form a separator 110. For example, a relatively flat tape may be formed into an X-shape or cross-shape as a result of being passed through one or more dies. As another example, two or more relatively flat tapes may be selectively folded and/or bonded together in order to form a separator with a desired cross-sectional shape. As explained in greater detail below with reference to FIGS. 7A-D, various layers of a tape separator may be selectively bonded together in order to form one or more cavities 125 that include extinguishant. As desired, a separator 110 may be formed in any number of suitable processing steps, such as a single pass or multi-step process. Additionally, a separator 110 may be formed with any number of suitable layers. In yet other embodiments, various components of the separator 110 (e.g., a central portion, fins or extensions, etc.) may be formed separately and then combined together.

As shown, the separator 110 may include one or more cavities 125 in which extinguishant may be positioned. Each cavity (generally referred to as cavity 125) may be a chamber, void, pocket, or other suitable enclosed space bounded by other portions of the separator (e.g., a body portion). Accordingly, the separator may have both one or more inner surfaces that define respective cavities and an outer surface that defines an outer periphery of the separator 110. According to an aspect of the disclosure, the twisted pairs 105A-D may be situated outside of the one or more cavities 125. In other words, the extinguishant may be maintained separately from the twisted pairs 105A-D such that the extinguishant does not contact the twisted pairs 105-AD absent a penetration, rupture, or other opening of a cavity 125 in which the extinguishant is situated.

Any number of cavities 125 may be incorporated into a separator 110 as desired. Although FIG. 1 illustrates a single cavity 125, any number of cavities may be present at any given cross-sectional location along a length of a separator 100. Additionally, each cavity 125 may be formed with a wide variety of suitable dimensions. As shown, the cavity 125 has an approximately circular cross-sectional shape. In other embodiments, a cavity may have an elliptical, square, rectangular, hexagonal, octagonal, or any other suitable cross-sectional shape. A cavity 125 may also have any suitable cross-sectional diameter and/or other dimensions (e.g., width, area, etc.) that define the cross-sectional size of the cavity 125. In certain embodiments, the cavity 125 may have a diameter between approximately 0.5 mm and approximately 2.5 mm. For example, the cavity 125 may have a diameter of approximately 0.5 mm, 1.0 mm, 1.5 mm, 2.0 mm, 2.5 mm, a diameter incorporated in a range between any two of the above values, or a diameter incorporated in a range bounded on a minimum or maximum end by one of the above values. In other embodiments, the cavity 125 may have a width and/or cross-sectional length dimension between approximately 1.0 mm and approximately 4.8 mm. As other examples, a cavity 125 may have a width/length dimension of approximately 0.5 mm, 1.0 mm, 1.5 mm, 2.0 mm, 2.5 mm, 3.0 mm, 3.5 mm, 4.0 mm, 4.5 mm, 5.0 mm, a value incorporated in a range between any two of the above values, or a value incorporated in a range bounded on a minimum or maximum end by one of the above values. In yet other embodiments, the cavity 125 may have a cross-sectional area between approximately 0.2 mm$^2$ and approximately 5 mm$^2$. For example, the cavity 125 may have a cross-sectional area or approximately 0.2 mm$^2$, 0.5 mm$^2$, 0.7 mm$^2$, 1.0 mm$^2$, 1.5 mm$^2$, 2.0 mm$^2$, 2.5 mm$^2$. 3.0 mm$^2$, 3.5 mm$^2$, 4.0 mm$^2$, 4.5 mm$^2$, 5.0 mm$^2$, a value incorporated in a range between any two of the above values, or a value incorporated in a range bounded on a minimum or maximum end by one of the above values. Additionally, in certain embodiments, the cavity 125 (or the combination of a plurality of longitudinal channels) may be sized in order to house a desired volume or amount of extinguishant.

In certain embodiments, a cavity 125 may have a longitudinal length that is approximately equivalent to the longitudinal length of a separator 110 or separator segment. In other embodiments, a cavity 125 may have a relatively shorter longitudinal length than a separator 110 or segment. Additionally, in certain embodiments, a plurality of cavities may be formed at respective locations along a longitudinal length of a separator 110. For example, a plurality of cavities may be formed along a common longitudinally extending line with any desired gaps or separations between adjacent cavities. Examples of suitable longitudinal lengths include, but are not limited to, 0.005 m, 0.01 m, 0.03 m, 0.05 m, 0.07 m, 0.1 m, 0.15 m, 0.2 m, 0.25 m, 0.3 m, 0.4 m, 0.5 m, 0.75 m, 1.0 m, 1.25 m, 1.5 m, 2.0 m, 2.5 m, 3.0 m, 4.0 m, 5.0 m, 10.0 m, a value incorporated in a range between any two of the above values, or a value incorporated in a range bounded on a minimum or maximum end by one of the above values (e.g., a value greater than 5.0 m, etc.). Additionally, a wide variety of suitable gaps or separation may be present between adjacent cavities. Examples of suitable separation gaps include, but are not limited to, 0.005 m, 0.01 m, 0.03 m, 0.05 m, 0.07 m, 0.1 in, 0.15 m, 0.2 m, 0.25 m, 0.3 m, 0.4 m, 0.5 m, 0.75 in, 1.0 m, a value incorporated in a range between any two of the above values, or a value incorporated in a range bounded on a minimum or maximum end by one of the above values.

According to an aspect of the disclosure, an extinguishant may be positioned within the one or more cavities 125. The extinguishant may be loosely positioned within the one or more cavities 125. In other words, the extinguishant is not compounded with any polymers and/or blended into the materials utilized to form a cable component. An extinguishant may be an agent that extinguishes fire. In certain embodiments, an extinguishant may include solid material, such as solid powders, particles, fragments, spheres, and/or other materials. Examples of suitable extinguishants include, but are not limited to, aluminum trihydrate, magnesium hydroxide, monoammonium phosphate, halogenated flame retardants, antimony oxides, organophosphorus, phosphate esters, etc. As desired, nanomaterials and/or other additives, such as nanoclays and/or carbon nanotubes, may be used in conjunction with flame retardant powders to improve or enhance their performance. As a result of incorporating an extinguishant into the separator 110, the flame retardant capabilities and/or flame performance of the cable 100 may be enhanced. In the event that the cable 100 is exposed to a fire or flame event, the fire or flame may rupture or penetrate any number of the cavities 125 incorporated into the separator 110 and/or other cable components. The extinguishant contained therein may then interact with the fire and assist in extinguishing the fire and/or limiting its propagation along the longitudinal length of the cable 100.

A wide variety of suitable methods or techniques may be utilized to form a cavity 125 as desired. In certain embodiments, as explained in greater detail below with reference to FIGS. 6A-C, the separator 110 may be extruded in a manner that facilitates the formation of one or more cavities in which extinguishant is positioned. As another example, as explained in greater detail below with reference to FIGS. 7A-D, one or more layers of a separator 110 (e.g., one or more tape layers, etc.) may be selectively attached to one another in order form one or more cavities in which extinguishant is positioned.

As desired in various embodiments, electromagnetic shielding material may be incorporated into the separator 110. A wide variety of different types of materials may be utilized to provide shielding, such as electrically conductive material, semi-conductive material, and/or dielectric shielding material. A few examples of suitable materials are described in greater detail below. Additionally, as desired in various embodiments, shielding material may be incorporated into the separator 110 at a wide variety of locations, for example, on an outer or external surface of the separator 110, on an inner surface of the separator 110 (e.g., an inner surface that defines one or more of the cavities 125, and/or embedded within the body of the separator 110 (e.g., blended into or otherwise incorporated into the body of the separator 110, positioned between layers of a separator body, etc.). In other embodiments, a separator 110 may be extruded, molded, or otherwise formed from a one or more suitable shielding materials. For example, a separator 110 may be formed from one or more conductive, semi-conductive, and/or dielectric shielding materials.

In certain embodiments, the separator 110 may include shielding material that is continuous along the longitudinal length of the separator 110. For example, a relatively continuous layer of shielding material may be formed on a separator surface. As another example, the separator 110 may be formed from one or more shielding materials. In other embodiments, the separator 110 may include discontinuous shielding material. With discontinuous shielding material, shielding material may be spaced throughout the separator 110 or within a layer of the separator 110 (e.g., a layer formed on a surface) and gaps or spaces may be present between adjacent shielding material components. In certain embodiments, one or more discontinuous patches of shielding material may be formed. For example, discontinuous patches of shielding material may be formed on one or more separator surfaces. As described in greater detail below, a wide variety of suitable configurations and/or patterns of shielding material may be formed as desired in various embodiments.

With continued reference to the cable 100 of FIG. 1, in certain embodiments, one or more shield layers can be disposed between the jacket 120 and one or more additional cable components. For example, as shown in FIG. 1, an external shield 115 or an overall shield may be disposed between the jacket 120 and the twisted pairs 105A-D. In other words, the external shield may be wrapped around and/or encompass the collective group of twisted pairs 105A-D. In certain embodiments, the shield 115 may be positioned between the twisted pairs 105A-D and the outer jacket 120. In other embodiments, the shield 115 may be embedded into the outer jacket 120, incorporated into the outer jacket 120, or even positioned outside of the outer jacket 120. As another example, as illustrated in FIG. 2, individual shields may be provided for each of the twisted pairs. As yet another example, shield layers may be provided for any desired groupings of twisted pairs. As desired, multiple shield layers may be provided, for example, individual shields and an overall shield. One or more shield layers may incorporate electrically conductive material, semi-conductive material, or dielectric shielding material in order to provide electrical shielding for one or more cable components. Further, in certain embodiments, the cable 100 may include a separate, armor layer (e.g., a corrugated armor, etc.) for providing mechanical protection.

Various embodiments of the external shield 115 illustrated in FIG. 1 are generally described herein; however, it will be appreciated that other shield layers may have similar constructions. In certain embodiments, a shield 115 may be formed from a single segment or portion that extends along a longitudinal length of the cable 100. In other embodiments, a shield 115 may be formed from a plurality of discrete segments or portions positioned adjacent to one another along a longitudinal length of the cable 100. In the event that discrete segments or portions are utilized, in certain embodiments, gaps or spaces may exist between adjacent segments or portions. In other embodiments, certain segments may overlap one another. For example, an overlap may be formed between segments positioned adjacent to one another along a longitudinal length of the cable.

As desired, a wide variety of suitable techniques and/or processes may be utilized to form a shield 115 (or a shield segment). As one example, a base material or dielectric material may be extruded, poltruded, or otherwise formed. Electrically conductive material or other shielding material may then be applied to the base material. In other embodiments, shielding material may be injected into the base material or the shield may be formed primarily from a shielding material (e.g., a dielectric shielding material). In other embodiments, dielectric material may be formed or extruded over electrically conductive material in order to form a shield 115. Indeed, a wide variety of suitable techniques may be utilized to incorporate shielding material into a shield 115. In certain embodiments, the base layer may have a substantially uniform composition and/or may be made of a wide range of materials. Additionally, the base layer may be fabricated in any number of manufacturing passes, such as a single manufacturing pass. Further, the base layer may be foamed, may be a composite, and/or may include one or more strength members, fibers, threads, or yarns. As desired, flame retardant material, smoke suppressants, and/or other desired substances may be blended or incorporated into the base layer.

In certain embodiments, the shield 115 (or individual shield segments) may be formed as a tape that includes both dielectric layers and a shielding layer (e.g., copper, aluminum, silver, an alloy, etc.) formed on one or both sides of the dielectric layer. Examples of suitable materials that may be used to form a dielectric layer include, but are not limited to, various plastics, one or more polymeric materials, one or more polyolefins (e.g., polyethylene, polypropylene, etc.), one or more fluoropolymers (e.g., fluorinated ethylene propylene ("FEP"), polyester, polytetrafluoroethylene, polyimide, or some other polymer, combination of polymers, or dielectric material(s) that does not ordinarily conduct electricity. Shielding material may then be deposited on, adhered to, or otherwise formed on the dielectric layer. Additionally, in certain embodiments, electromagnetic shielding material may be sandwiched between two dielectric layers. In other embodiments, at least two electromagnetic shielding layers may be combined with any number of suitable dielectric layers to form the shield 115. For example, a four layer construction may include respective electromagnetic shielding layers formed on either side of a first dielectric layer. A second dielectric layer may then be formed on one of shielding layers to provide insulation between the shielding layer and the twisted pairs 105A-D. Indeed, any number of suitable layers of material may be utilized to form a tape used as a shield 115.

Additionally, as shown in FIG. 1, one or more cavities 130 may be incorporated into a shield 115 as desired in various embodiments, and extinguishant may be positioned within the one or more cavities 130. As set forth in greater detail above with respect to the separator 110, any number of cavities may be incorporated into a shield 115, and each cavity may have a wide variety of suitable dimensions (e.g., cross-sectional shapes, lengths, widths, etc.). Additionally, cavities may be formed utilizing a wide variety of suitable methods and/or techniques, for example, suitable extrusion processes and/or selectively attaching shield layers together. In one example embodiment, a shield 115 may be formed from a plurality of relatively flat layers (e.g., dielectric layers, electromagnetic shielding layers, tape layers, etc.) that are attached to one another. Additionally, at least two layers may be selectively attached to one another in order to form cavities 130 between the two layers. For example, two dielectric layers may be ultrasonically welded, adhered or otherwise affixed together at locations that define an outer periphery of one or more cavities 130. As another example, a dielectric layer and an electromagnetic shielding layer (e.g., patches of shielding material, etc.) may be ultrasonically welded, adhered or otherwise affixed together at locations that define an outer periphery of one or more cavities 130.

As set forth above, either a separator 110, a shield (e.g., an overall shield 115), or any other suitable component may provide electromagnetic shielding for a cable 100. Any of these components may be generally referred to as a shield element. Additionally, as previously mentioned, shielding material may be incorporated into a shield element utilizing a wide variety of suitable techniques and/or configurations. For example, a shield element may be formed (e.g., extruded, molded, etc.) from a shielding material. As another example, shielding material may be embedded into a shield element. As yet another example, shielding material may be formed on a base layer or a dielectric layer. In certain embodiments, a separate base dielectric layer and shielding layer may be bonded, adhered, or otherwise joined (e.g., glued, etc.) together to form a shield element. In other embodiments, shielding material may be formed on a dielectric layer via any number of suitable techniques, such as the application of metallic ink or paint, liquid metal deposition, vapor deposition, welding, heat fusion, adherence of patches to the dielectric, or etching of patches from a metallic sheet. In certain embodiments, the patches of shielding material can be over-coated with an electrically insulating film, such as a polyester coating.

In certain embodiments, a shield element may be a relatively continuous shield element or a discontinuous shield element having a plurality of isolated patches of shielding material. For non-segmented or continuous shield elements, a plurality of patches of shielding material may be incorporated into the shield element, and gaps or spaces may be present between adjacent patches in a longitudinal direction. For segmented shield elements, each segment or section of the shield element may include either a single patch or a plurality of patches of shielding material with gaps between adjacent patches. A wide variety of different patch patterns may be formed as desired in various embodiments, and a patch pattern may include a period or definite step. In other embodiments, patches may be formed in a random or pseudo-random manner. Additionally, for discontinuous shields, individual patches may be separated from one another so that each patch is electrically isolated from the other patches. That is, the respective physical separations between the patches may impede the flow of electricity between adjacent patches. In certain embodiments, the physical separation of other patches may be formed by gaps or spaces, such as gaps of dielectric material or air gaps.

A wide variety of suitable materials and/or combination of materials may be utilized to form shielding layers and/or patches of shielding material. In certain embodiments, one or more electrically conductive materials may be utilized including, but not limited to, metallic material (e.g., silver, copper, nickel, steel, iron, annealed copper, gold, aluminum, etc.), metallic alloys, conductive composite materials, etc. Indeed, suitable electrically conductive materials may include any material having an electrical resistivity of less than approximately $1 \times 10^{-7}$ ohm meters at approximately 20° C. In certain embodiments, an electrically conductive material may have an electrical resistivity of less than approximately $3 \times 10^{-8}$ ohm meters at approximately 20° C. In other embodiments, one or more semi-conductive materials may be utilized including, but not limited to, silicon, germanium, other elemental semiconductors, compound semiconductors, materials embedded with conductive particles, etc. In yet other embodiments, one or more dielectric shielding materials may be utilized including, but not limited to, barium ferrite, etc.

The components of a shield element or various segments of a shield element may include a wide variety of suitable dimensions, for example, any suitable lengths in the longitudinal direction and/or any suitable thicknesses. For example, the body portion of a separator may have a thickness of about 0.4 to about 4.0 mils (thousandths of an inch) or about 10 to about 100 microns. As another example, the dielectric or base portion of a shield layer may have a thickness of about 1 to about 5 mils (thousandths of an inch) or about 25 to about 125 microns. Additionally, each patch of shielding material may have any desired thickness, such as a thickness of about 0.5 mils (about 13 microns) or greater. In many applications, signal performance benefits from a thickness that is greater than about 2 mils, for example in a range of about 2.0 to about 2.5 mils, about 2.0 to about 2.25 mils, about 2.25 to about 2.5 mils, about 2.5 to about 3.0 mils, or about 2.0 to about 3.0 mils. Indeed, with a thickness of less than about 1.5 mils, negative insertion loss characteristics may be present on the cable 100.

A wide variety of segment and/or patch lengths (e.g., lengths along a longitudinal direction of the cable 100) may be utilized. As desired, the dimensions of the segments and/or patches can be selected to provide electromagnetic shielding over a specific band of electromagnetic frequencies or above or below a designated frequency threshold. In various embodiments, the segments and/or patches can have a length of about 0.05, 0.1, 0.2, 0.25, 0.3, 0.4, 0.5, 0.75, 1.0, 1.5, 2.0, 2.5, 3.0, 3.5, 4.0, 4.5, 5.0, 6.0, 7.5, 8.0, 10.0 meters, a length included in a range between any two of the above values, or a length included in a range bounded on either a minimum or maximum end by one of the above values. In the event that a plurality of patches is formed on a shield element or a shield element segment (e.g., a plurality of patches in a longitudinal direction, a plurality of patches formed across a width or circumferential directions, etc.), a wide variety of suitable gap distances or isolation gaps may be provided between adjacent patches. For example, the isolation spaces may define a space between adjacent patches of about 0.5, 1.0, 1.5, 2.0, 2.5, 3.0, 3.5, 4, 5, 6, 7, 8, 9, 10, 15, 20, 25, or 30 millimeters, or a space included in a range between any two of the above values, or a space included in a range bounded on either a minimum or maximum end by one of the above values. As explained in greater detail below with reference to FIG. 8F, in certain embodiments, a plurality of microcuts may be utilized to form a gap between two patches. Additionally, as desired, the patches may be formed as first patches (e.g., first patches on a first side of a dielectric material or body portion, on an outer surface), and second patches may be formed on an opposite side of the shield element (e.g., on an opposite side of a dielectric material or body portion, within a longitudinal channel, etc.). For example, second patches may be formed to correspond with the gaps or isolation spaces between the first patches. As desired, the patches may have a wide variety of different shapes and/or orientations. For example, the patches may have a rectangular, trapezoidal, or parallelogram shape. A few example shapes for patches are described in greater detail below with reference to FIGS. 8A-8G.

In certain embodiments, patches may be formed to be approximately perpendicular (e.g., square or rectangular segments and/or patches) to the longitudinal axis of the adjacent one or more pairs 105A-D (e.g., pairs enclosed by a shield, pairs adjacent to a separator, etc.). In other embodiments, patches may have a spiral direction that is opposite or the same as the twist direction of the enclosed one or more pairs 105A-D. For example, if the twisted pair(s) 105A-D are twisted in a clockwise direction, then the patches may spiral in a counterclockwise direction. Thus, twisted pair lay opposes the direction of the segment and/or patch spiral. The opposite directions may provide an enhanced level of shielding performance.

According to an aspect of the disclosure, one or more techniques may be utilized to reduce and/or eliminate electrical perturbations between shielding patches and/or at the circumferential edges of a shield element. As one example technique, in certain embodiments, at least one patch included in a shield element may be electrically shorted to itself or electrically continuous along a circumferential direction of the shield element. As another example, a shield element may be formed with overlapping segments in order to effectively eliminate longitudinal spaces or gaps between adjacent patches formed on the shield element. For example, a shield element may be formed to include a plurality of electrically conductive patches arranged in a discontinuous manner; however, in contrast to certain conventional shield elements, the shield element may not include spaces or gaps between certain patches along its longitudinal direction. The shield element may include a plurality of discrete overlapping segments or sections along a longitudinal length of the cable, and each segment may include at least one patch of shielding material. The combination of the segments may form a discontinuous shield element; however, the overlapping nature of the segments may eliminate gaps between certain patches along a longitudinal direction. Thus, the discontinuous shield element may exhibit improved electrical performance relative to conventional discontinuous shields.

As desired in various embodiments, a wide variety of other materials may be incorporated into the cable 100. For example, as set forth above, the cable 100 may include any number of conductors, twisted pairs, optical fibers, and/or other transmission media. As another example, as illustrated in FIG. 2, one or more respective dielectric films or other suitable components may be positioned between the individual conductors of one or more of the twisted pairs 105A-D. In certain embodiments, one or more tubes or other structures may be situated around various transmission media and/or groups of transmission media. Additionally, as desired, a cable may include a wide variety of strength members, swellable materials (e.g., aramid yarns, blown swellable fibers, etc.), insulating materials, dielectric materials, flame retardants, flame suppressants or extinguishants, gels, and/or other materials. The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1. Further, a wide variety of different cable components may be formed to include one or more cavities in which extinguishant may be positioned.

FIG. 2 is a cross-sectional view of another example twisted pair cable 200 that may include one or more components that include cavities in which extinguishant may be positioned, according to an illustrative embodiment of the disclosure. The cable 200 of FIG. 2 may include components that are similar to the cable 100 illustrated and described above with reference to FIG. 1. Accordingly, the cable 200 may include a plurality of twisted pairs 205A-D disposed in a cable core. A separator 210 may be disposed between at least two of the twisted pairs 205A-D and may function to orient and/or provide desired spacing between two or more of the twisted pairs 205A-D.

With continued reference to FIG. 2, an outer jacket 215 may enclose the internal components of the cable 200. Additionally, as shown, the jacket 215 may include one or more cavities 220 in which extinguishant may be positioned. Similar to the separator 110 and shield 115 discussed above with reference to FIG. 1, any number of cavities 220 may be incorporated into the jacket 215, and each cavity may have a wide variety of suitable dimensions (e.g., cross-sectional shapes, lengths, widths, etc.). Additionally, cavities may be formed utilizing a wide variety of suitable methods and/or techniques, for example, suitable extrusion processes and/or selectively attaching layers of jacket material together.

The separator 210 illustrated in FIG. 2 has a different cross-sectional shape than the separator 110 of FIG. 1. More specifically, the separator 210 is formed as a relatively flat separator 210. In certain embodiments, the separator 210 may approximately bisect the cable core such that two pairs are positioned on either side of the separator 210. Additionally, in accordance with an aspect of the disclosure, the separator 210 may include one or more cavities 225A, 225B in which extinguishant may be positioned. As shown, a plurality of cavities 225A, 225B may be situated at a given cross-sectional location along the separator 210. As described in greater detail above, the cavities 225A, 225B may have a wide variety of suitable dimensions (e.g., cross-sectional shapes, lengths, widths, etc.). Additionally, the cavities 225A, 225B may be formed utilizing a wide variety of suitable methods and/or techniques, for example, suitable extrusion processes and/or selectively attaching layers of jacket material together.

Additionally, as desired in certain embodiments, each of the twisted pairs 205A-D may be individually shielded. For example, shield layers 230A-D may respectively be wrapped or otherwise formed around each of the twisted pairs 205A-D. In other words, a first shield layer 230A may be formed around a first twisted pair 205A, a second shield layer 230B may be formed around a second twisted pair 205B, a third shield layer 230C may be formed around a third twisted pair 205C, and a fourth shield layer 230D may be formed around a fourth twisted pair 205D. In other embodiments, a portion or none of the twisted pairs may be individually shielded. Indeed, a wide variety of different shielding arrangements may be utilized in accordance with various embodiments of the disclosure. Additionally, as desired, any of the shield layers 230A-D may be formed to include one or more cavities in which extinguishant may be positioned. The cavities may be formed in a similar manner as that described above for the shield 115 illustrated in FIG. 1.

With continued reference to FIG. 2, in certain embodiments, respective dielectric separators 235A-D may be woven helically between the individual conductors or conductive elements of one or more of the twisted pairs 205A-

D. In other words, a dielectric separator (generally referred to as dielectric separator 235) may be helically twisted with the conductors of a twisted pair 205 along a longitudinal length of the cable 200. In certain embodiments, the dielectric separator 235 may maintain spacing between the individual conductors of the twisted pair 205 and/or maintain the positions of one or both of the individual conductors. For example, the dielectric separator 235 may be formed with a cross-section (e.g., an X-shaped cross-section, an H-shaped cross-section, etc.) that assists in maintaining the position(s) of one or both the individual conductors of the twisted pair 205. In other words, the dielectric separator 235 may reduce or limit the ability of one or both of the individual conductors to shift, slide, or otherwise move in the event that certain forces, such as compressive forces, are exerted on the cable 200. As illustrated in FIG. 2, in other embodiments, a dielectric separator 235 may be formed as a relatively simple film layer that is positioned between the individual conductors of a twisted pair 205. In yet other embodiments, a dielectric separator 235 may have a first component positioned between the conductors of a twisted pair 205 and at least one other component (e.g., a shield component, etc.) that is wrapped around an outer periphery of the twisted pair. As desired, dielectric separator 235 may be formed to include one or more cavities in which extinguishant may be positioned. The cavities may be formed in a similar manner as that described herein for other cable components.

Similar to the cable 100 illustrated in FIG. 1, the cable 200 illustrated in FIG. 2 is provided by way of example only. Embodiments of the disclosure contemplate a wide variety of other twisted pair cables and cable constructions. These other cables may include more or less components than the cables 100, 200 illustrated in FIGS. 1 and 2. For example, other cables may include alternative shielding arrangements and/or different types of separators or fillers. Additionally, certain components may have different dimensions and/or materials than the components illustrated in FIGS. 1 and 2.

Turning now to FIG. 3, a cross-sectional view of an example optical fiber cable 300 is illustrated. The illustrated cable 300 may have a plurality of buffer tubes 305A-D positioned around and/or stranded around a central strength member 310. Although four buffer tubes 305A-D are illustrated, any number of buffer tubes can be utilized. In other embodiments, the buffer tubes 305A-D may be situated around a central tube, a central group of twisted pairs, or other central cable component(s)). Additionally, although a single ring or layer of buffer tubes 305A-D is illustrated, in other embodiments, multiple rings or concentric layers of buffer tubes may be utilized. A jacket 315 may be formed around the buffer tubes 305A-D and the central strength member 310.

Each buffer tube (generally referred to as buffer tube 305) may be configured to contain or house optical fibers. Any number of optical fibers, other transmission elements, and/or other components may be positioned within a buffer tube 305. In certain embodiments, optical fibers may be loosely positioned in a tube (as shown in buffer tubes 305A, 305C), wrapped or bundled together, or provided in one or more ribbons (as shown in buffer tubes 305B, 305D). In other embodiments, a buffer tube 305 may be formed as a microtube having an inner diameter that is sized to allow the optical fibers to move relative to one another while preventing the optical fibers from crossing over or overlapping one another. In other words, a microtube may permit the optical fibers to flex or move as the cable 300 is flexed or bent while simultaneously maintaining the position of each optical fiber relative to the other optical fibers. In certain embodiments, an inner diameter of a microtube 305 may be determined based at least in part on the number of optical fibers to be positioned within the microtube 305 and/or the outer diameters of the optical fibers. In other embodiments, one or more tight-buffered optical fibers may be incorporated into the cable 300 as an alternative to fibers positioned in one or more buffer tubes.

In certain embodiments, water-blocking material (e.g., a water blocking gel, grease, etc.) may also be provided within a buffer tube 305. Alternatively, a buffer tube 305 may be filled with a gas, such as air, powder, a moisture absorbing material, a water-swellable substance, dry filling compound, or foam material, for example in interstitial spaces between the optical fibers. Each optical fiber utilized in the cable 300 may be a single mode fiber, multi-mode fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness.

A buffer tube 305 may be formed from a wide variety of suitable materials and/or combinations of materials, such as various polymeric materials (e.g., polypropylene, polyethylene, copolymers, etc.), polyvinyl chloride ("PVC"), polybutylene terephthalate ("PBT"), etc. Additionally, a buffer tube 305 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a flame retarding or other suitable additive may be incorporated into a first layer but not into a second layer. Further, the buffer tube 305 may have any suitable inner and/or outer diameters as desired in various applications.

In certain embodiments, a buffer tube 305 may be formed to include one or more cavities 320 in which extinguishant may be positioned. As set forth above with reference to the various components of FIGS. 1 and 2, any number of cavities 320 may be incorporated into a buffer tube 305. Additionally, each cavity 320 may have any suitable cross-sectional shape and/or dimensions. Further, a wide variety of suitable methods and/or techniques may be utilized to form a buffer tube 305 that includes one or more cavities. Similarly, a tight buffer layer may be formed to include one or more cavities in which extinguishant may be positioned.

The outer jacket 315 may define an outer periphery of the cable 300. The jacket 315 may enclose the internal components of the cable 300, seal the cable 300 from the environment, and provide strength and structural support. The jacket 315 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 315 may also include flame retardant materials, smoke suppressant materials, carbon black or other suitable material for projection against exposure to ultraviolet ("UV") light, and/or other suitable additives. The jacket 315 may include a single layer or, alternatively, multiple layers of material (i.e., multiple layers of the same material, multiple layers of different materials, etc.). Additionally, in certain embodiments, the jacket 315 may be formed to include one or more cavities in which extinguishant is positioned in a similar manner as that described above with reference to FIG. 2. As desired, the jacket 315 may be characterized as an outer sheath, a casing, a circumferential cover, or a shell.

The jacket 315 may define one or more openings or cores in which other components of the cable 300 are disposed. A wide variety of suitable cable components may be situated within a cable core as desired, such as buffer tubes, transmission media, strength members, spacers, water swellable material, etc. Additionally, the illustrated cable 300 has a circular or approximately circular cross-sectional profile. In other embodiments, other cross-sectional profiles (e.g., an elliptical or oval profile, etc.) and/or dimensions may be utilized as desired. In other words, the jacket 315 may be formed to result in any desired shape. The jacket 315 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable 300. For example, a cable profile may facilitate duct or conduit installation, and the cable 300 may be designed to withstand a specified installation tensile loading and/or other suitable design parameters.

As desired, any number of strength members may be incorporated into the cable 300 at a wide variety of suitable locations. As shown, the cable 300 may include a central strength member ("CSM") 310. In other embodiments, one or more strength members may be embedded in the jacket 315. For example, the jacket 315 may be formed or extruded around one or more strength members. Indeed, a wide variety of strength member configurations may be utilized. A strength member, such as the CSM 310, may be formed from a wide variety of suitable materials. For example, a strength member may be formed from metal wires (e.g., steel wire, etc.), metal rods, plastic rods, fiber-reinforced plastic ("FRP") rods, glass-reinforced plastic ("GRP") rods, fiberglass, or any other suitable material or combination of materials. Additionally, a strength member may have any desired diameter and/or other dimensions (e.g., cross-sectional area, thickness, etc.). In certain embodiments, the dimensions of a strength member may be determined based at least in part upon a desired positioning of the strength member and/or a desired application for a cable.

In certain embodiments, a strength member may be formed to include one or more cavities 325 in which extinguishant may be positioned. In certain embodiments, the one or more cavities 325 may be positioned between two layers of the strength member. For example, the one or more cavities may be positioned between a central portion (e.g., a rod portion, etc.) and another portion (e.g., an outer coating, etc.) of a strength member. As another example, one or more cavities may be formed through a body portion of the strength member. Indeed, as described in greater detail herein with respect to other cable components, a wide variety of suitable methods or techniques may be utilized to form one or more cavities in a strength member. Additionally, a cavity 325 may be formed with a wide variety of suitable cross-sectional shapes and/or dimensions.

With continued reference to FIG. 3, in certain embodiments, one or more spacers or fillers 330A, 330B may be incorporated into a cable 300. For example, one or more spacers 330A, 330B may be stranded around the CSM 310 along with the buffer tubes 305A-D. In certain embodiments, one or more spacers 330A, 330B may be utilized to fill in gaps between certain buffer tubes 305A-D in order to provide the cable 300 with a desired cross-sectional shape, such as a round shape. A spacer (generally referred to as spacer 330) may be formed from a wide variety of suitable materials and/or combinations of materials, such as polymeric materials, PVC, PBT, etc. Additionally, in certain embodiments, a spacer 330 may be formed to include one or more cavities 335 in which extinguishant may be positioned. As set forth above with reference to the various components of FIGS. 1 and 2, any number of cavities 335 may be incorporated into a spacer 330. Additionally, each cavity 335 may have any suitable cross-sectional shape and/or dimensions. Further, a wide variety of suitable methods and/or techniques may be utilized to form a spacer 330 that includes one or more cavities 335. For example, the spacer 330 may be extruded in a manner that forms one or more cavities 335 within the interior cross-section of the spacer 330, and extinguishant may be positioned within the one or more cavities 335.

In certain embodiments, the cable 300 may include an armor (not shown) inside or encompassed within the jacket 315. The armor may provide mechanical (e.g., rodent resistance, etc.) and/or electrical protection for transmission media situated within the cable core. The armor may be formed from a wide variety of suitable materials, such as a metal (e.g., steel, a copper alloy, etc.) tape that is formed into a tube, fiberglass, glass, epoxy, and/or appropriate polymeric materials. In certain embodiments, the armor may be formed as an interlocking armor or a corrugated armor. Additionally, an armor may be formed as a single layer armor or alternatively an armor may have multiple layers.

As desired, the cable 300 may also include water swellable materials and/or water dams for impeding flow of any water that inadvertently enters the cable 300, for example due to damage of the outer jacket 315. Upon contact with water, water swellable materials may absorb the water and swell, helping to prevent the water from damaging the optical fibers. Impeding the longitudinal flow of water also helps confine any fiber damage to facilitate repair. Accordingly, water dams may help to limit water damage. As shown in FIG. 3, a water swellable tape or wrap 340 may be positioned in a cable core and wrapped around one or more other cable components, such as the buffer tubes 305A-D and the spacers 330A, 330B. In other embodiments, one or more water swellable materials (e.g., water swellable yarns, etc.) 345 may be positioned in interstices between core components, such as between one or more buffer tubes 305A-D or between one or more buffer tubes 305A-D and a cable jacket 315. In yet other embodiments, individual core components may be partially or completely wrapped with water swellable materials. As desired in various embodiments, water swellable materials may be provided in a continuous or discontinuous manner along a longitudinal length of the cable 300. Additionally or alternatively, water blocking material (e.g., water blocking dams) may be intermittently incorporated into the cable core. A wide variety of suitable water blocking materials and/or combinations of materials may be utilized as desired.

The cable 300 illustrated in FIG. 3 is provided by way of example only to illustrate one potential optical fiber cable construction in which one or more components may include cavities in which extinguishant is positioned. A wide variety of other components and/or combinations of components may be incorporated into an optical fiber cable as desired in other embodiments. Additionally, a cable may be designed to satisfy any number of applicable cable standards. Further, in accordance with an aspect of the disclosure, a cable may be formed with at least one component that includes one or more cavities in which extinguishant may be positioned. It will be appreciated that a wide variety of suitable components may be formed with one or more cavities. Additionally, any of the cavity features and/or formation techniques described herein may be applicable to any suitable cable component.

Example Cable Components

Figure 4A:
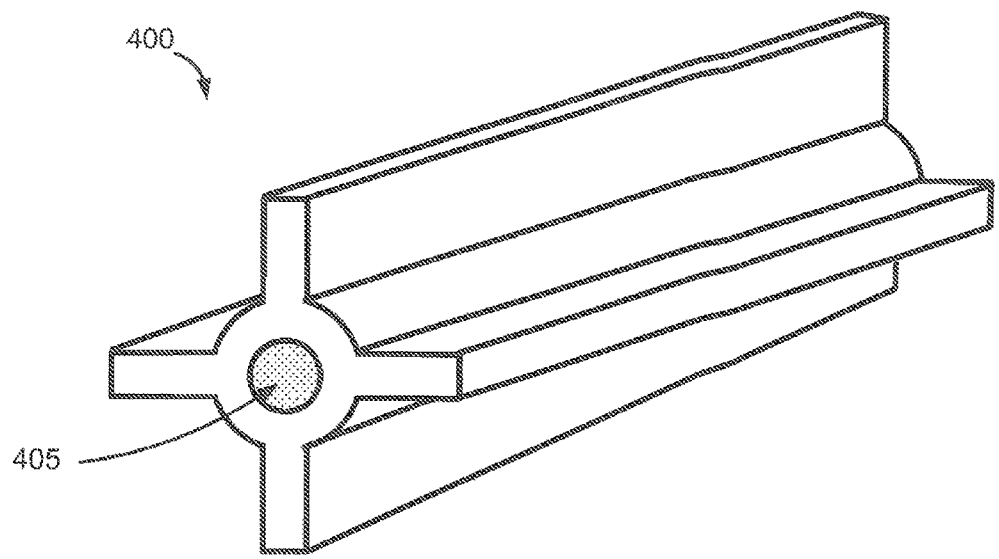
FIGS. 4A-4B are perspective views of example separators that may be incorporated into cables in accordance with various illustrative embodiments of the disclosure.
Figure 4B:
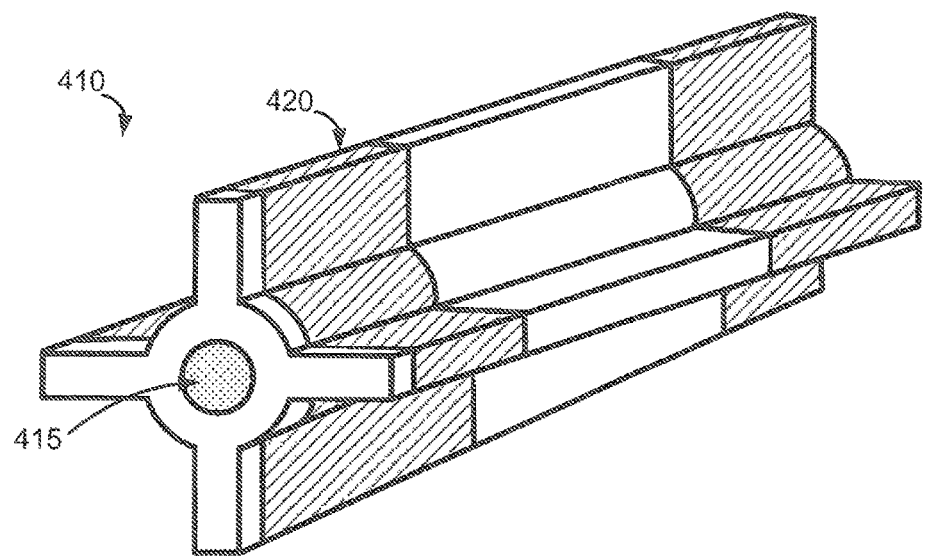

As set forth above, a wide variety of suitable cable components may be formed to include one or more cavities in which extinguishant may be positioned. A few example separator components are described in greater detail below with reference to FIGS. 4A-5H. It will be appreciated that other cable components may be formed in a similar manner as the example separators to include one or more cavities. A cable component, such as a separator, may be formed with a wide variety of suitable constructions, cross-sectional shapes, and/or dimensions. FIGS. 4A-4B are perspective views of example separator constructions, and the example constructions illustrate a few of the different features that may be incorporated into separators. FIGS. 5A-5H are cross-sectional views of example separator constructions that illustrate a few example cross-sectional shapes, cavity positions, and/or material constructions that may be utilized for separators and/or other cable components. Each of these figures is discussed in greater detail below. Any of the example separators may be incorporated into a wide variety of cables, such as the cables 100, 200 illustrated in FIGS. 1-2. Similarly, other cable components that include cavities may be incorporated into a wide variety of suitable cable constructions.

Turning first to FIG. 4A, a perspective view of a first example separator 400 is illustrated. The separator 400 may include at least one cavity 405 in which extinguishant may be positioned. As described above with reference to FIG. 1, any number of cavities may be incorporated into the separator 400, and each cavity may have any desired shape, size, and/or other dimensions. Additionally, separator 410 may be formed from a wide variety of suitable materials. For example, the separator 400 may be formed from dielectric, semi-conductive, and/or electromagnetic shielding material.

FIG. 4B illustrates another example separator 410 that may include one or more cavities 415 in which extinguishant may be positioned. Much like the separator 400 of FIG. 4A, the separator 410 of FIG. 4B may include a body portion formed from a wide variety of suitable materials and any number of cavities may be formed in the body portion. Additionally, the separator 410 may include shielding material that provides electromagnetic shielding for the twisted pairs and/or other transmission media incorporated into a cable. As shown, the separator 410 may include shielding material 420 formed on its external surface.

As set forth above with reference to FIG. 1, a wide variety of suitable types of shielding material may be utilized, such as electrically conductive material (e.g., aluminum, etc.). Additionally, shielding material may be formed in accordance with a wide variety of suitable configurations. For example, in certain embodiments, relatively continuous shielding material may be formed along a longitudinal length of the separator 410. In other embodiments, discontinuous patches of shielding material may be formed, and dielectric spaces or gaps may be present between adjacent patches. A wide variety of suitable patterns of shielding material may be utilized as desired, and a few example patterns are described in greater detail below with reference to FIGS. 5A-8G. These patterns may include a wide variety of patch sizes and/or dimensions, as well as a wide variety of suitable gap sizes between patches. Additionally, in certain embodiments, discontinuous patches of shielding material may be formed in a random or pseudo-random manner.

FIG. 4B illustrates each patch of shielding material as being formed around an outer periphery the separator 410. In other embodiments, patches may only extend partially around the outer periphery of the separator 410. As desired in various embodiments, a patch may cover any desired portion of the surface of a separator 410 and/or may extend any desired amount around an outer periphery of the separator 410. Additionally, in certain embodiments, patches of shielding material may be alternated between various portions of the separator 410 along its longitudinal length. For example, patches may be alternated between individual quadrants of a separator along its longitudinal length or between pairs of quadrants. As another example, patches may be altered between a top half and a bottom half of a separator along its longitudinal length. A wide variety of other suitable patch configurations may be formed as desired. In yet other embodiments, various components of a separator, such as one or more prongs or desired sections or portions of prongs may be formed from shielding material.

The separators illustrated in FIGS. 4A-4B are illustrated as being continuous along their entire longitudinal length. In other words, each of the separators includes at least one portion that is continuous along the entire longitudinal length. In other embodiments, a separator may be formed from a plurality of severed or discrete portions that are arranged adjacent to one another (e.g., end to end) along a longitudinal length of a cable. As desired, one or more of the separator segments or portions may include one or more respective cavities in which extinguishant may be positioned.

Figure 5A:
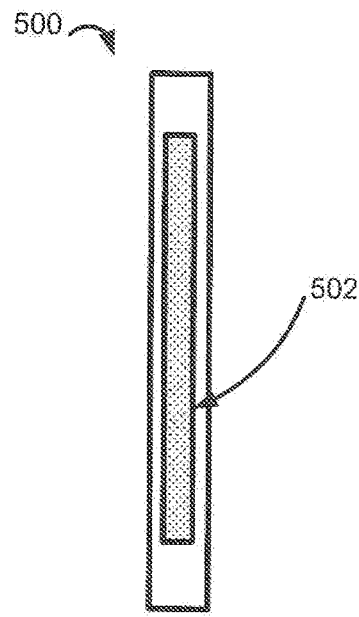
FIGS. 5A-5H are cross-sectional views of example separator, filler, or other suitable components that may be incorporated into cables in accordance with various illustrative embodiments of the disclosure.

The example separators illustrated in FIGS. 4A-4B each have an approximate cross or X-shaped cross-sectional shape. In other embodiments, separators may be formed with a wide variety of other suitable cross-sectional shapes. FIGS. 5A-5H illustrate cross-sectional views of example separators that may be utilized in accordance with various embodiments of the disclosure. FIG. 5A illustrates an example separator 500 having a relatively flat shape. The separator 500 may be positioned between two or more of the twisted pairs of a cable. For example, the separator 500 may be positioned within the cable in order to bisect (or otherwise divide) a cable core, and two twisted pairs may be disposed on either side of the separator 500.

The separator 500 is illustrated as including a single cavity 502; however, in other embodiments, the separator 500 may include a plurality of cavities. Additionally, the separator 500 has a relatively uniform thickness. In other words, the cavity 502 may be formed through the separator 500 without modifying or expanding the outer circumference and/or other dimensions of the separator 500 to accommodate the cavity 602. Further, the cavity 502 may be formed with a wide variety of suitable shapes and/or dimensions. As shown, the cavity 502 has a relatively thin rectangular cross-sectional shape. In other embodiments, the cavity 502 may have a circular, elliptical, square, or other suitable shape.

Figure 5B:
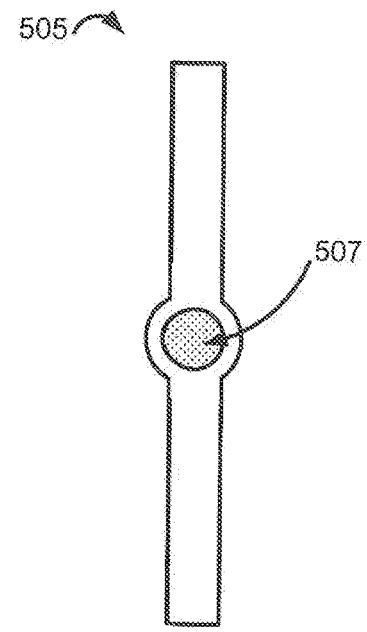

FIG. 5B illustrates another example separator 505 having a relatively flat shape. In other words, the separator 505 may be positioned within a cable in order to bisect a cable core. However, in contrast to the separator 500 of FIG. 5A, the thickness of the separator 505 may be modified in order to accommodate one or more cavities 507. For example, a cavity 507 may be formed with dimensions (e.g., a circumference for a circular channel, etc.) that result in the expansion of a body portion of the separator 505 away from a purely flat shape in order to accommodate the cavity 507. In other words, areas of the separator 505 through which a cavity is formed may have a different thickness than other areas of the separator 505.

Figure 5C:
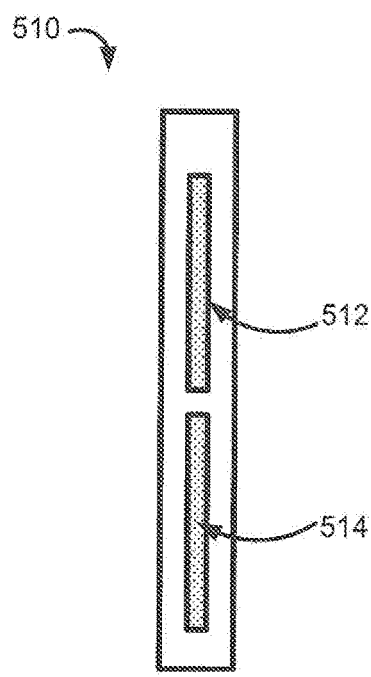

FIG. 5C illustrates another example separator 510 having a relatively flat shape and a plurality of cavities 512, 514. For separators with multiple cavities, the cavities may be arranged in any suitable configuration. For example, as illustrated in FIG. 5C, the cavities 512, 514 may be positioned in a top to bottom row along the separator 510. In other embodiments, two or more cavities may be arranged in a side by side configuration. As desired, a body portion of the separator 510 may be expanded in order to accommodate one or more cavities. Other configurations of cavities may be incorporated into flat separators as desired in other embodiments. Additionally, the separators and/or cavities may include any suitable dimensions.

A wide variety of suitable methods and/or techniques may be utilized to form a flat separator. For example, in certain embodiments, a relatively flat separator may be extruded in any number of suitable extrusions processes and/or steps. As another example, a relatively flat separator may be formed by combining any number of suitable flat layers, such as dielectric tapes and/or electromagnetic shielding material together. Other relatively flat cable components, such as shield layers, may be formed in a similar manner.

Figure 5D:
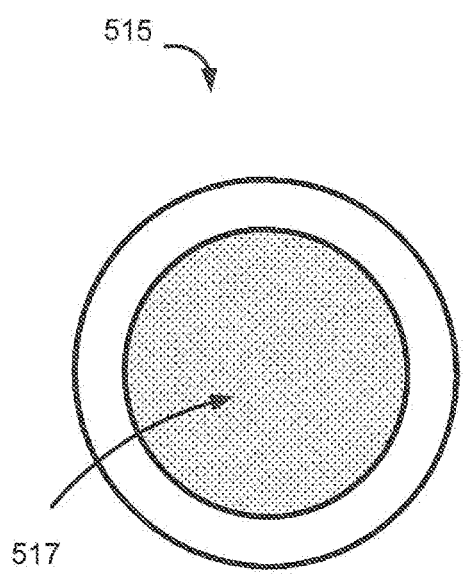
Figure 5E:
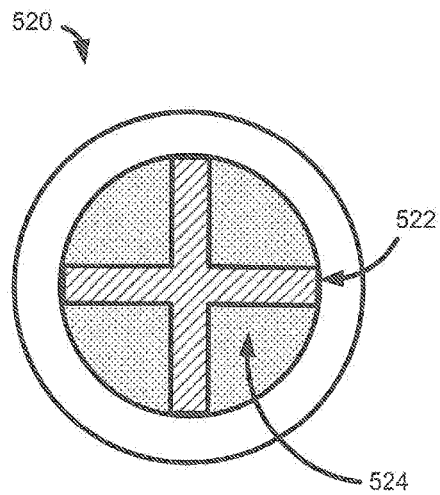

FIG. 5D illustrates an example separator 515 having a rod shape. The separator 515 may have a circular or elliptical cross-section, and at least one cavity 517 may be formed in the body of the separator 515. As shown, the cavity 517 may have a relatively circular cross-sectional shape; however, in other embodiments, the cavity 517 may be formed with other suitable shapes (e.g., rectangular, square, elliptical, etc.). Additionally, as shown in FIG. 5E, a rod shaped separator 520 may be formed that includes one or more internal ribs or dividers 522 positioned within a cavity 524. In certain embodiments, the internal rib(s) 522 may provide structural support to the separator 520 and/or assist the separator 520 in maintaining its shape. Additionally, the internal rib(s) 522 may divide an internal cavity 524 into any desired number of separate cavities in which extinguishant may be positioned.

In certain embodiments, a separator may have a relatively uniform body portion that is formed from the same material or group of materials. In other embodiments, different components of the separator body may be formed from different materials. For example, with reference to FIG. 5E, the internal rib(s) 522 or internal support structure may be formed from different materials than the outer rod-shaped or tube portion of the separator 520. For example, the outer rod-shaped portion may be formed from one or more polymeric or dielectric materials (which may have shielding material formed on one or more surfaces), and the internal rib(s) 522 may be formed from and/or include one or more heat sink materials. Other suitable constructions and/or groups of materials may be utilized as desired in other embodiments.

Although example rod-shaped separators are described in FIGS. 5D and 5E, it will be appreciated that other cable components may be formed in a similar fashion. For example, one or more spacers or strength members may be formed to include a rod shape, and one or more cavities may be incorporated into the cable components.

Figure 5F:
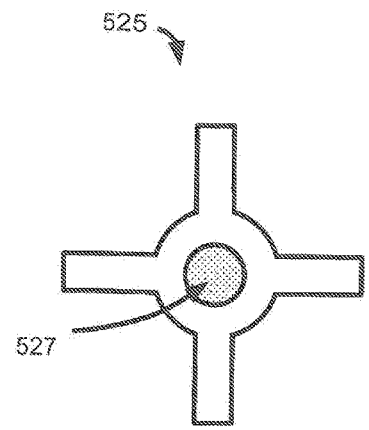

FIG. 5F illustrates an example separator 525 having an approximate cross, plus, or X-shape. The separator 525 may form four channels, and a respective twisted pair may be positioned within each channel. As shown, the separator 525 includes four fins extending from a central portion. However, as desired in other embodiments, one or more of the fins may be offset from the central point. Additionally, as desired, one or more extensions (not shown) may extend laterally from the ends of one or more of the fins. The extensions may be configured to contact the outer jacket of a cable (or any intermediate shielding or other layer) and may assist in holding the separator 525 in place. Additionally, at least cavity 527 may be formed through the separator 525. Much like the separator 505 of FIG. 5B, a thickness and/or other suitable dimensions of the separator 525 may be modified in order to accommodate the longitudinal channel 527.

Figure 5G:
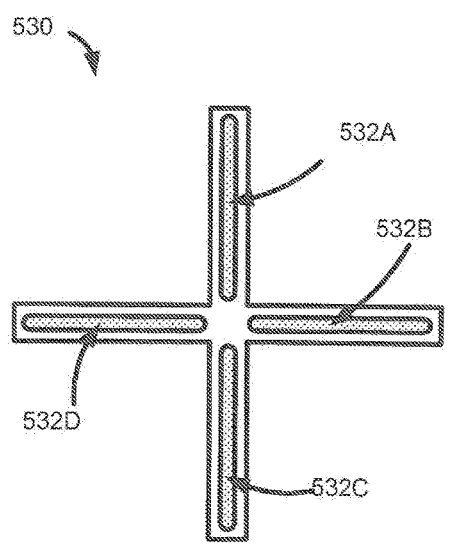

FIG. 5G illustrates another example cross-shaped separator 530 in which one or more cavities 532A-D are formed through a body portion. However, the dimensions of the separator body are not materially modified or expanded in order to accommodate the cavities 532A-D. In other words, barring any processing limitations, the thickness of various separator portions (e.g., a central portion, the prongs or extensions, etc.) may be approximately equal or uniform. Any number of cavities may be incorporated into the separator 530 as desired. Additionally, the cavities 532A-D are each illustrated as being formed in a respective prong of the separator 530. Indeed, cavities may be formed in any portion of a separator body as desired.

Figure 5H:
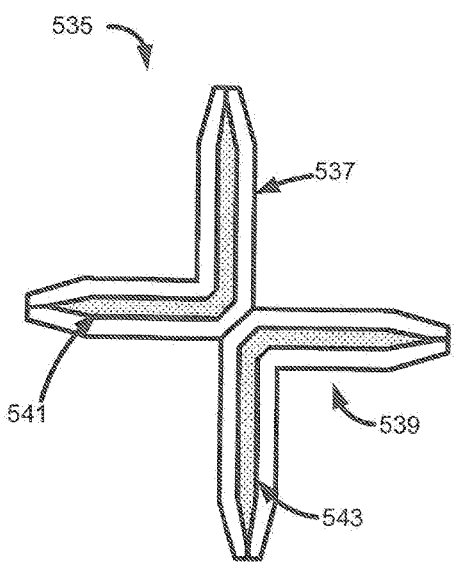

FIG. 5H illustrates an example separator 535 formed from a plurality of relatively flat structures, such as two flat tape structures 537, 539. For example, a first tape structure 537 may be folded such that it forms two prongs of a cross-shaped separator 535, and a second tape structure 539 may be folded such that it forms the other two prongs of the cross-shaped separator 535. The two tapes 537, 539 may be optionally bonded together at or near a center point of the cross-shaped separator 535. Additionally, at least one of the tapes 537, 539 may include one or more respective cavities 541, 543 in which extinguishant may be positioned.

In other embodiments, a separator may be formed from other numbers of tapes. For example, a flat separator may be formed from a single tape. As another example, a single tape may be folded in order to form a wide variety of separator shapes, such as a cross-shaped separator or a T-shaped separator. In yet other embodiments, two tapes may be utilized to form a wide variety of separator shapes. In yet other embodiments, more than two tapes may be utilized to form a separator. Additionally, regardless of the materials utilized to form a separator, a separator may be formed with a wide variety of other suitable cross-sectional shapes, such as a T-shape, a J-shape, a Y-shape, an L-shape, a diamond shape, or other suitable shape. Further, in certain embodiments, one or more prongs or other portions of a separator may extend beyond an outer periphery of the twisted pairs of a cable. The extending portion(s) may be wrapped at least partially around an outer periphery of the twisted pairs in order to form a wrap, such as an inner jacket or shield layer, around the twisted pairs. A wide variety of other suitable separators may be utilized in other embodiments. These separators may include any suitable shapes and/or dimensions. Additionally, separators may include any of the features and/or combination of features described and illustrated above with respect to FIGS. 4A-5H. The separators discussed herein are provided by way of non-limiting example only.

Figure 6A:
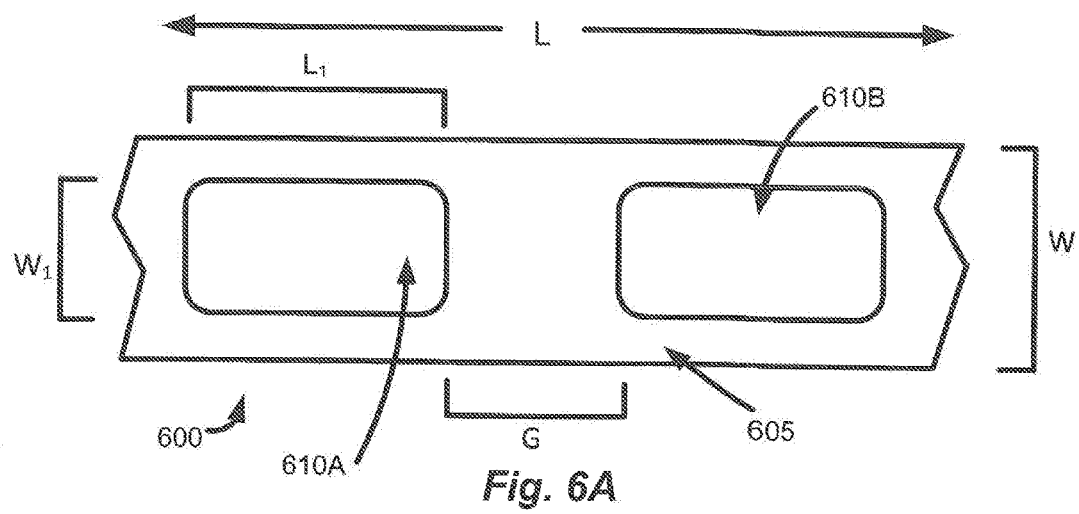
FIGS. 6A-6C are top and cross-sectional views of an example extruded cable component that incorporates an extinguishant, accordance to an illustrative embodiment of the disclosure.
Figure 6B:
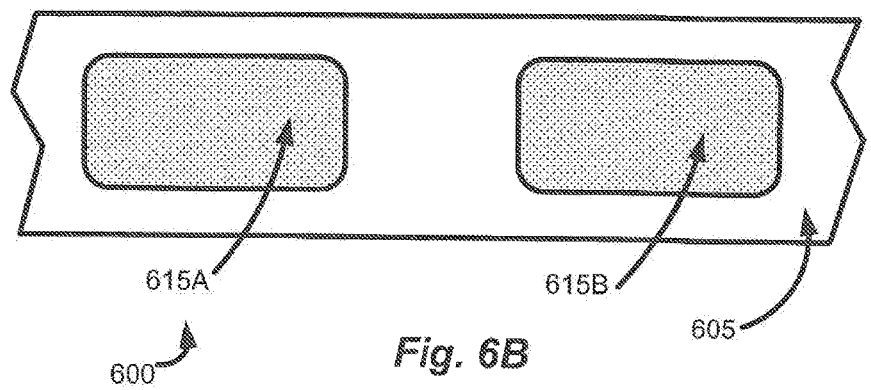
Figure 6C:
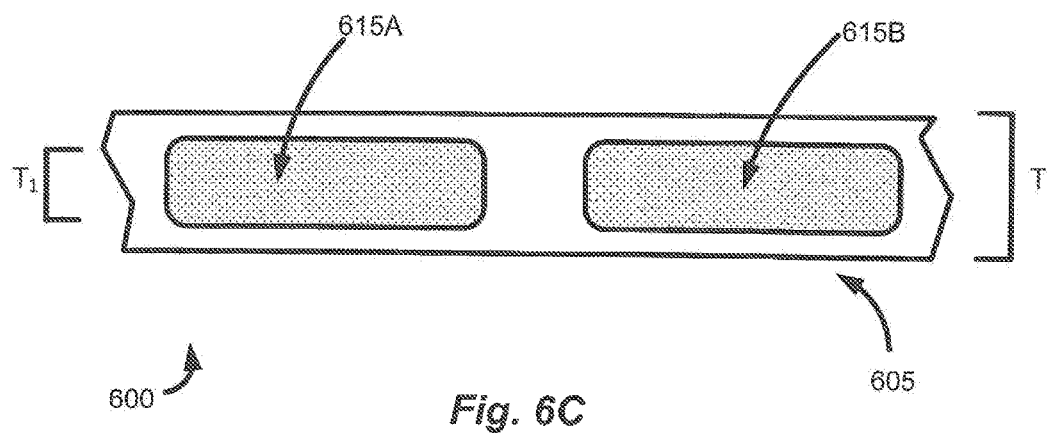

A wide variety of suitable methods and/or techniques may be utilized to form a cable component that includes one or more cavities in which extinguishant is positioned. A few example techniques are described below with reference to FIGS. 6A-7D. Turning first to FIGS. 6A-6C, a technique for extruding a cable component with one or more cavities is illustrated. A wide variety of suitable cable components may be formed via extrusion including, but not limited to, separators, inner and/or outer jackets, spacers or fillers, buffer tubes, strength members, shield layers, etc.

A top view of an example cable component 600 is illustrated in FIG. 6A. With reference to FIG. 6, a first portion of the cable component 600 is shown, such as a first portion formed via a first extrusion operation. The cable component 600 may include a body portion 605, and any number of suitable indentations 610A, 610B may be formed in the body portion 605. Each of the indentations (generally referred to as indentation 610) may correspond to a cavity within which extinguishant may be positioned. Following formation of the first portion, extinguishant may be positioned within the one or more indentations 610, 610B, and a second portion of the component 600 may be formed via a second extrusion operation. The second extrusion operation may function to enclose the indentations 610A, 610B in order to form cavities 615A, 615B as illustrated in FIGS. 6B and 6C. FIG. 6B illustrates a top view of the cable component 600 following positioning of extinguishant within the indentations 610A, 610B and formation of a second portion that encloses the indentations 610A, 610B and forms cavities 615A, 615B. FIG. 6C illustrates a side cross-sectional view of the component 600 following the second extrusion operation that forms the second portion.

The component 600 may be formed with a wide variety of suitable dimensions. The body portion 605 may extend in a longitudinal direction "L" for any suitable longitudinal length or distance. The longitudinal direction "L" may correspond to the longitudinal direction of a cable into which the component 600 is incorporated. Additionally, the component 600 may be formed with a wide variety of suitable cross-sectional shapes. For ease in explanation, the body portion 605 is illustrated in FIG. 6C as having a relatively flat cross-sectional shape; however, a wide variety of other shapes may be utilized. For example, the component 600 may be formed with a X-shaped, T-shaped, round, or other suitable cross-sectional shape. Given the relatively flat cross-sectional shape, the component 600 may have any suitable width "W", thickness "T", and/or other suitable dimensions.

Any number of indentations 610A, 610B may be formed in the component 600 as desired. Each indentation (generally referred to as indentation 610), well, or pool may also have a wide variety of suitable dimensions. For example, an indentation 610 may have any suitable longitudinal length "$L_1$", width "$W_1$", and/or thickness "$T_1$" (or depth). As shown in FIGS. 6A-6C, a plurality of indentations may be formed in an end-to-end manner along a longitudinal length of the component 600. In other embodiments, one or more indentations may run approximately an entire longitudinal length of the component 600. Additionally, as set forth above with reference to FIG. 1, each indentation indention 610 may have any suitable longitudinal length "$L_1$". Further, FIGS. 6A-6C illustrate indentations 610 having a width "$W_1$" that is slightly less than the width "W" of the component 600. In other words, each indentation 610 may span approximately across a widthwise dimension (or other suitable dimension) of the component 600. In other embodiments, an indentation may be formed with other suitable widths. As desired, a plurality of indentations may be formed across a widthwise (or other suitable dimension) of a component 600. Such a configuration is described in greater detail below with reference to FIGS. 7B and 7D. An indentation 610 may also have any suitable thickness "$T_1$" As explained in greater detail above with reference to FIG. 1, an indentation 610 (and/or cavity 615) may be formed with a wide variety of suitable cross-sectional shapes and/or areas. With the relatively simplistic indentations illustrated in FIGS. 6A-6C, an indentation 610 may have a cross-sectional area that is approximately equal to the product of the indentation's width "$W_1$" and thickness "$T_1$". Further, an indentation may be capable of housing any suitable volume of extinguishant. Additionally, with continued reference to FIGS. 6A-6C, any suitable gap or spacing "G" may be present between any adjacent indentations, whether the gap is formed in a longitudinal, widthwise, or other dimension.

The component 600 may be extruded from a wide variety of suitable materials and/or combinations of materials. For example, as set forth in greater detail above, a component 600 may be extruded from suitable polymeric, semi-conductive, flame-retardant, and/or other materials. A wide variety of suitable devices, equipment, and/or systems may be utilized to extrude the cable component 600. For example, a wide variety of suitable extrusion dies, extrusion heads, and/or other suitable devices may be utilized to extrude the cable component 600. In certain embodiments, a dual extrusion process may be utilized. For example, one or more first extrusion devices may extrude the first portion of the component 600, and one or more second extrusion devices may extrude the second portion of the component 600 following the positioning of extinguishant in the indentation(s) 610A, 610B.

Additionally, a wide variety of suitable devices, equipment, and/or systems may be utilized to position extinguishant within one or more indentations 610A, 610B and/or cavities 615A, 615B. In certain embodiments, extinguishant may be deposited, blown, or otherwise positioned into one or more indentations 610A, 610B. As desired, one or more adhesive materials may be positioned in the one or more indentations 610A, 610B and/or mixed with the extinguishant in order to facilitate positioning of the extinguishant into the indentations 610A, 610B. In other embodiments, electrostatic charge may be utilized to facilitate positioning of the extinguishant into the indentations 610A, 610B. Following positioning of the extinguishant, a second portion of the component 600 may be added in order to encapsulate the extinguishant in one or more cavities 615A, 615B. In other embodiments, extinguishant may be injected into one or more cavities 615A, 615B following extrusion of the component 600. In yet other embodiments, the cavities may be formed as caves or open-ended channels, and extinguishant may be air-blown or otherwise positioned into a channel. The channel may then be enclosed via a subsequent extrusion process. A wide variety of other suitable techniques may be utilized as desired to position extinguishant within one or more cavities 615A, 615B, and the techniques described herein are provided by way of non-limiting example only.

As an alternative to extruding a cable component, a cable component may be formed by attaching or affixing a plurality of layers of material together. For example, a shield layer, separator, or a suitable portion of a component (e.g., a portion of a separator, etc.) may be formed by affixing one or more relatively flat tapes or other layers together. Two or more layers may be selectively affixed to one another in order to define or create one or more cavities in which extinguishant may be positioned. In other embodiments, an outer layer or portion of a component may be selectively affixed to another portion of a component (e.g., a cable jacket, a CSM, a buffer tube, etc.) in order to form one or more cavities in which extinguishant may be positioned. FIGS. 7A-7D illustrate a few example components 700, 730 that may be formed by selectively affixing two or more layers of materials together.

Figure 7A:
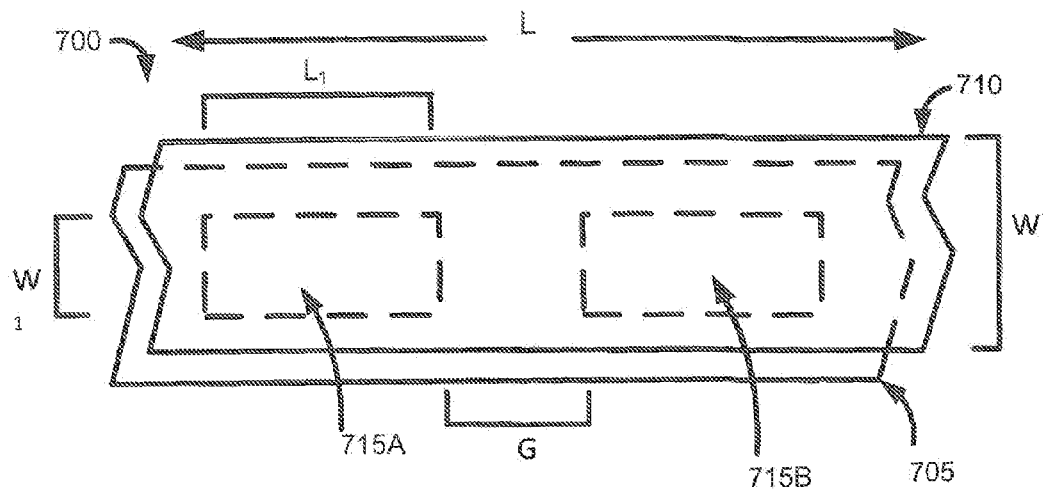
FIGS. 7A-7D are top and cross-sectional views of example cable components in which an extinguishant is sandwiched between two layers that are affixed to one another, according to various illustrative embodiments of the disclosure.

FIG. 7A illustrates a top level view of a first example cable component 700 that may be formed by selectively affixing two or more layers to one another. As shown, a first layer 705, such as a first dielectric layer or base layer, may be provided. A second layer 710, such as a second dielectric layer, layer of electromagnetic material, a layer that includes patches of shielding material, etc., may then be positioned adjacent to (e.g., over) the first layer 705 and selectively affixed to the first layer 705. In certain embodiments, the two layers 705, 710 may be selectively affixed to one another so as to define one or more cavities 715A, 715B in which extinguishant is positioned. For example, the two layers 705, 710 may be affixed to one another at least along the outer peripheries of the cavities 715A, 715B. Additionally, in certain embodiments, extinguishant may be positioned in the cavities 715A, 715B prior to the cavities 715A, 715B being completely enclosed. For example, extinguishant may be positioned between the layers 705, 710 prior to the layers 705, 710 being affixed together. As another example, extinguishant may be positioned within partially constructed cavities (i.e., when the layers have been affixed to one another so as to define a portion of the outer periphery or outline of a cavity, etc.). FIG. 7C illustrates a cross-sectional view of the component 700 taken through one of the cavities (generally referred to as cavity 715) along the width dimension "W". As shown, the layers 705, 710 have been affixed together in order to define the cavity 715, and extinguishant may be positioned within the cavity 715.

Although FIG. 7A illustrates two layers 705, 710 being selectively affixed together in order to form a component 700, any number of other layers may be incorporated into the component 700 as desired. For example, additional dielectric, shielding, and/or water blocking layers may be added to a component. Additionally, extinguishant may be positioned between any of the layers of material. In certain embodiments, multiple cavities of extinguishant may be positioned between the same two layers of material. In other embodiments, at least two cavities may be positioned between different sets of material.

Each of the layers 705, 710 utilized to form the component 700 may be formed from any suitable material and/or combinations of material. Additionally, each layer may have any suitable dimensions. For example, a layer may have any suitable longitudinal length "L", width "W", thickness, and/or other suitable dimensions. Further, as explained in greater detail above with reference to FIGS. 1 and 6A-6C, each cavity 715 may be formed with a wide variety of suitable dimensions. For example, a cavity 715 may have any suitable length "$L_1$", width "$W_1$", and/or other dimensions. Additionally, a wide variety of suitable gaps, spacings, and/or separation distances "G" may be present between adjacent cavities.

Figure 7B:
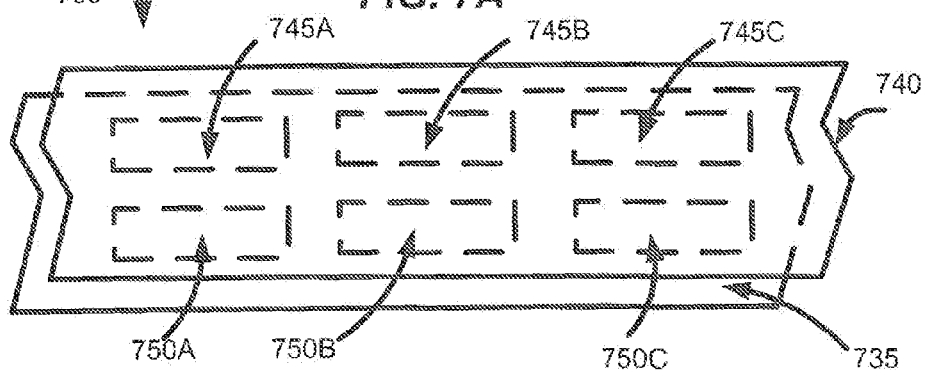
Figure 7C:
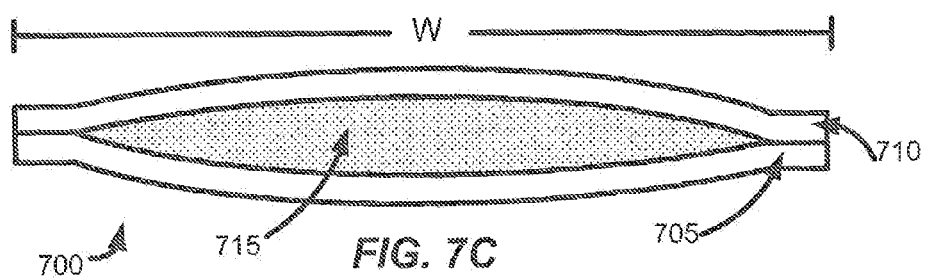
Figure 7D:
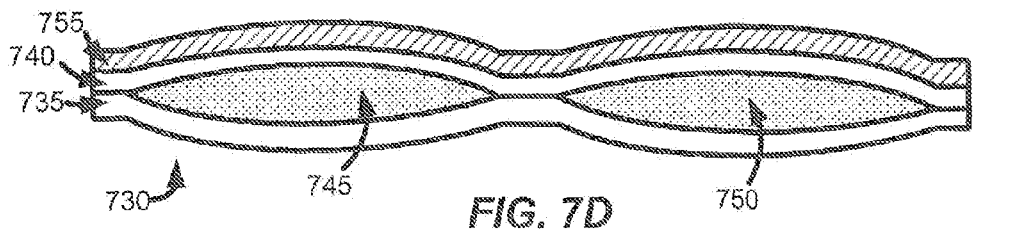

Turning now to FIG. 7B, a top level view of another example cable component 730 that may be formed by selectively affixing two or more layers to one another is illustrated. A cross-sectional view of the component 730 along the width dimension "W" is illustrated in FIG. 7D. The cable component 730 may be similar to the component 700 described above with reference to FIG. 7A. Accordingly, the cable component 730 may include first and second layers 735, 740 that are selectively affixed to one another in order to form or define one or more cavities 745A-C, 750A-C. However, in contrast to the component 700 of FIG. 7A, the component 730 of FIG. 7B may include a plurality of cavities across its width dimension. As shown, a first row of one or more cavities 745A-C may extend in a longitudinal direction parallel to a second row of one or more cavities 750A-C. Each cavity may have any suitable dimensions, such as any suitable length, width, etc. Additionally, any suitable gaps, spacings, and/or separation distances may be present between adjacent cavities. Indeed, a wide variety of suitable cavity configurations may be incorporated into a cable component.

Additionally, with reference to FIG. 7D, a layer of electromagnetic shielding material 755 may be incorporated into a cable component 730. In certain embodiments, the shielding material 755 may be formed, affixed to, or deposited on an underlying dielectric layer 740. In other embodiments, the shielding material 755 may be selectively affixed to an underlying layer. In this regard, one or more cavities 745, 750 may be formed between the shielding material 755 and an underlying layer. Indeed, cavities may be formed between any suitable layers of a cable component 730.

A wide variety of suitable methods and/or techniques may be utilized to selectively affix or attach layers of a cable component together. In certain embodiments, two layers of a cable component may be selectively adhered or glued to one another. In other embodiments, two layers may be selectively bonded or ultrasonically welded to one another. In yet other embodiments, physical attachment devices and/or means (e.g., staples, fasteners, etc.) may be utilized to selectively affix layers together. Additionally, a wide variety of suitable devices, equipment, and/or systems may be utilized to position extinguishant within one or more cavities. For example, extinguishant may be deposited, blown, or otherwise positioned into one or more cavities either before or as two layers of a component are selectively affixed. As desired, one or more adhesive materials may be positioned in a cavity and/or or one or more of the layers to facilitate positioning of the extinguishant. As another example, electrostatic charge may be utilized to facilitate positioning of the extinguishant. In other embodiments, extinguishant may be injected into one or more cavities following the attachment of two layers. In yet other embodiments, cavities may be formed as caves or open-ended channels, and extinguishant may be air-blown or otherwise positioned into a channel. The channel may then be enclosed via a subsequent attachment process. For example, two layers may be affixed to one another on three sides, extinguishant may be added into an open cavity, and the cavity may then be enclosed. A wide variety of other suitable techniques may be utilized as desired to position extinguishant within one or more cavities, and the techniques described herein are provided by way of non-limiting example only.

Figure 8A:
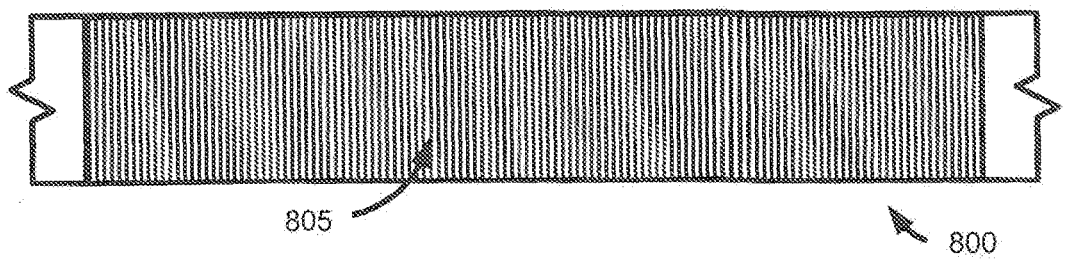
FIGS. 8A-8G are top level views of various configurations of electrically conductive material that may be incorporated into cable components as desired in various embodiments of the disclosure.

As set forth above, a wide variety of different shielding configurations and/or arrangements of shielding material may be utilized in conjunction with separators, shields, and/or other shield elements. FIGS. 8A-8G illustrate top level views of example shielding material configurations that may be utilized in various embodiments. These configurations are applicable to one or more separator surfaces (e.g., an outer surface, the surface of a longitudinal channel, etc.), shielding layer surfaces, embedded layers of shielding material incorporating into a shield element, segments of a severed shield element, etc. With reference to FIG. 8A, an example shield element 800 may include relatively continuous shielding material 805. For example, a continuous patch of shielding material may be formed on a surface of the shielding element 800. As another example, a shielding structure 800 may be formed from a shielding material or impregnated with shielding material along its entire length.

Figure 8B:
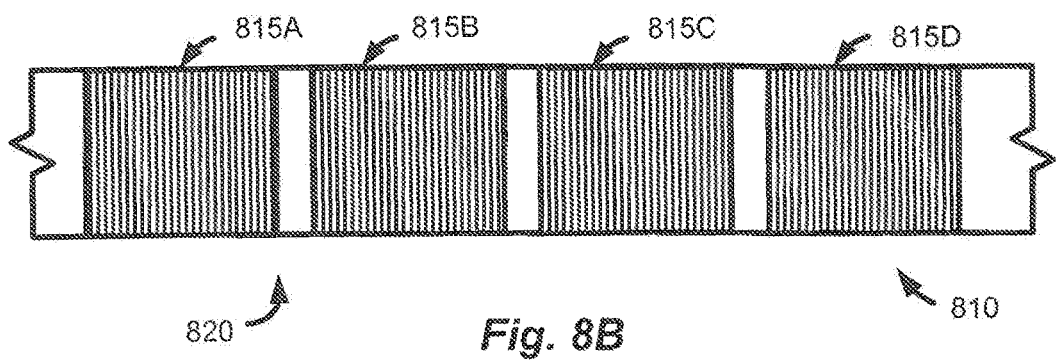

With reference to FIG. 8B, a top level view of another example shield element 810 is illustrated. The shield element 810 may include any number of rectangular patches of shielding material, such as patches 815A-D formed on a dielectric material or otherwise incorporated into the shield element. As desired in various embodiments, the patches 815A-D may include any desired lengths, and any desired gap 820 or separation distance may be provided between adjacent patches. In certain embodiments, the patches may be formed in accordance with a repeating pattern having a definite step or period. As desired, additional patches may be formed on an opposing side of the dielectric material to cover the gaps 820.

Figure 8C:
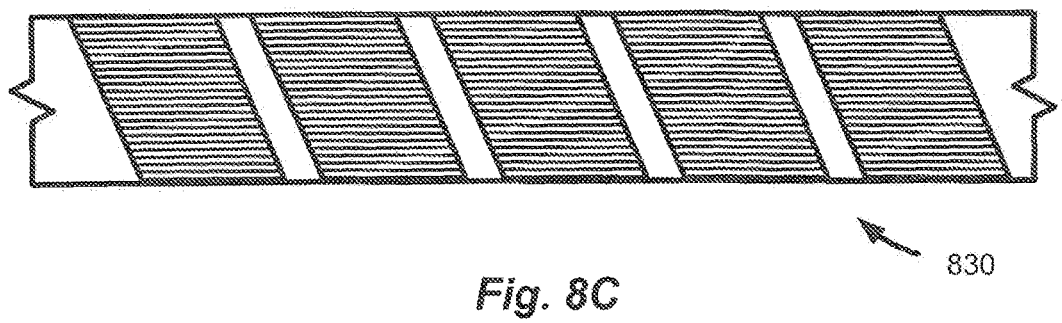
Figure 8D:
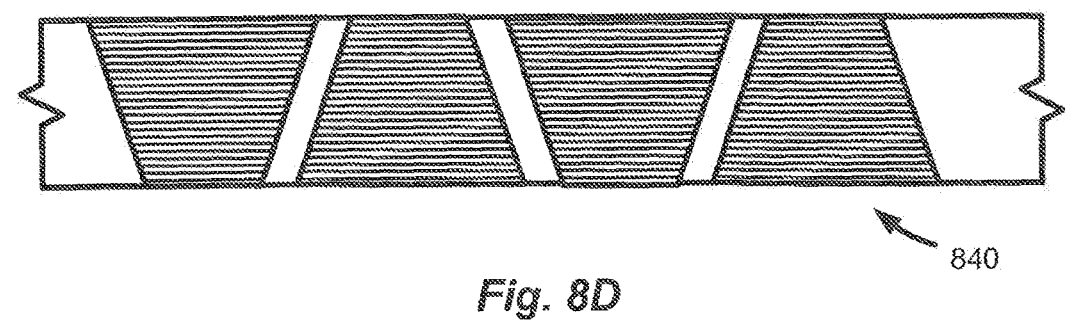

FIG. 8C illustrates a top level view of another example shield element 830. The shield element 830 may include any number of patches of shielding material having the shape of a parallelogram. In other words, the patches may be formed at an angle within one or more areas of the shield element 830. As shown, the patches may be formed at an acute angle with respect to the width dimension of the shield element 830. In certain embodiments, the acute angle facilitates manufacturing and/or enhances patch-to-substrate adhesion. Additionally, the acute angle may also facilitate the covering of opposing isolating spaces or gaps. In certain embodiments, benefit may be achieved when the acute angle is about 45 degrees or less. In other embodiments, benefit is achieved when the acute angle is about 35 degrees or less, about 30 degrees or less, about 25 degrees or less, about 20 degrees or less, or about 15 degrees or less. In other embodiments, benefit is achieved when the acute angle is between about 12 and 40 degrees. In certain embodiments, the acute angle may be in a range between any two of the degree values provided in this paragraph or a range bounded on a minimum or maximum end by one of the provided values. FIG. 8D illustrates a top level view of another example shield element 840 that may be utilized in various embodiments. The structure 840 may include any number of patches of shielding material having a trapezoidal shape. In certain embodiments, the orientation of adjacent trapezoidal patches may alternate. Similar to the patch pattern illustrated in FIG. 8C, the trapezoidal patches may provide manufacturing and/or shielding benefits.

Figure 8E:
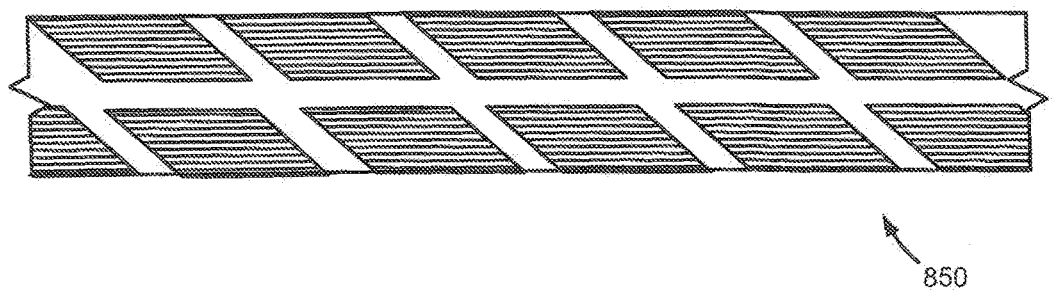

In certain embodiments, patches of shielding material may be formed across a dimension of a shield element, such as across a width dimension that is perpendicular to a longitudinally extending direction of the shield element. In other embodiments, multiple patches may be formed across a given dimension, such as a width dimension. FIG. 8E illustrates a top level view of an example shield element 850 in which multiple patches are formed across a width dimension. As desired, patches may be discrete or discontinuous along any dimension of the shield element 850 and/or across multiple dimensions (e.g., a width and a length dimension). Additionally, any number of patches may be formed across a given dimension. Each patch may have a wide variety of suitable dimensions (e.g., widths, lengths, etc.), and/or a wide variety of suitable separation gaps may be formed between adjacent patches.

Figure 8F:
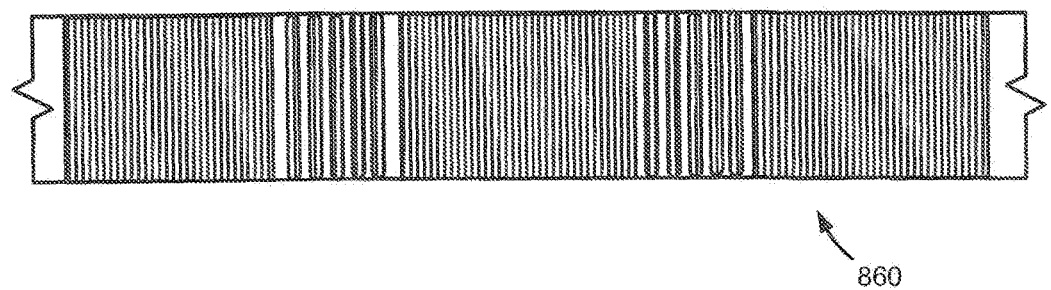

FIG. 8F illustrates a top level view of an example shield element 860 in which one or more respective microcuts are utilized to form gaps between adjacent patches of shielding material. In certain embodiments, the width of each of these microcuts may be less than or equal to approximately 0.25 mm. These relatively narrow microcuts may limit the leakage of the shield element 860, and therefore, reduce noise during electrical transmission using a cable. In certain embodiments, a series of microcuts may be placed in relatively close proximity to one another. For example, a series of microcuts may be formed as an alternative to a traditional space or gap between patches of shielding material. As one example, a conventional discontinuous shield may include gaps or spaces between adjacent patches that are at least approximately 0.050 inches (approximately 1.27 mm) wide. By contrast, a plurality of relatively narrow or fine microcuts (e.g., microcuts of approximately 0.25 mm, etc.) may be formed in an approximately 0.050 inch wide portion (or any other desired width) of a shield element. Additionally, it is noted that the use of singular or isolated microcuts within a shield element may allow electricity to arc across the microcuts, thereby leading to a safety hazard. However, a plurality of microcuts positioned or formed in relatively close proximity to one another may limit safety risks due to electrical arcing. Any electrical arcing across the microcut gaps will likely burn up or destroy the electrically conductive material between the closely spaced microcuts, thereby breaking or severing the electrical continuity of the shield element and preventing current from propagating down the shield element. In other words, the microcuts may be spaced and/or formed to result in a shield element that includes shielding material having a sufficiently low mass such that the shielding material will fuse or melt when current is applied.

Although the examples above describe situations in which conventional spaces or gaps are respectively replaced with a series of microcuts, a wide variety of other suitable configurations of microcuts may be utilized in other embodiments. For example, a shield element may include microcuts continuously spaced in close proximity to one another along a longitudinal length of the shield element. In other embodiments, sections or patches of microcuts may be spaced at regular intervals or in accordance with any desired pattern. Each section or patch may include at least two microcuts. A wide variety of suitable patterns may be formed by microcuts. For example, a section of microcuts (e.g., one section of a repeating pattern, etc.) may include microcuts having a perpendicular line pattern, a dashed vertical line pattern, a square pattern, an inverse square pattern, a diamond-shaped pattern, an inverse diamond-shaped pattern, a checkerboard pattern, an angled line pattern, a curved line pattern, or any other desired pattern. As another example, a section of microcuts may include microcuts that form one or more alphanumeric characters, graphics, and/or logos. In this regard, product identification information, manufacturer identification information, safety instructions, and/or other desired information may be displayed on a shield element. In yet other embodiments, sections or patches of microcuts may be positioned in random locations along a shield element. Additionally, a wide variety of suitable methods and/or techniques may be utilized to form microcuts. For example, one or more lasers may be utilized to form microcuts.

Figure 8G:
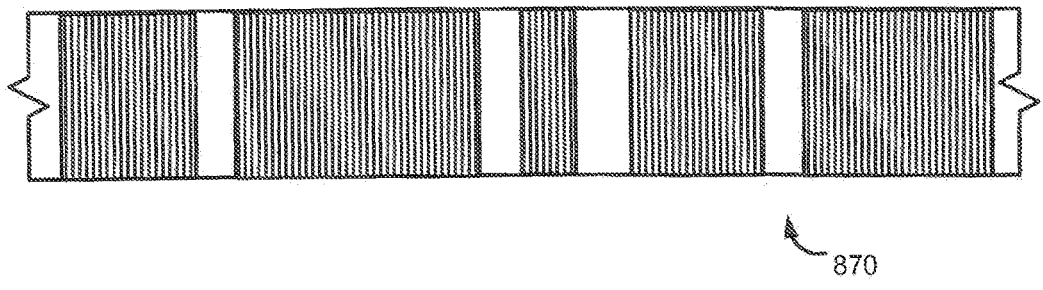

FIG. 8G depicts a top level view of another example shield element 870 that may be utilized in various embodiments. The shield element 870 may include a plurality of discontinuous patches or sections of shielding material that are formed in a random or pseudo-random manner. A wide variety of other suitable patch configurations and/or other configurations of shielding material may be utilized as desired in other embodiments, and the configurations discussed herein are provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable comprising:
at least one transmission media; and
at least one component comprising:
a first layer;
a second layer selectively affixed to the first layer in order to define a plurality of cavities, wherein the at least one transmission media is not positioned within any of the plurality of cavities; and
respective extinguishant material loosely positioned within each of the plurality of cavities.

2. The cable of claim 1, wherein the extinguishant material comprises at least one of (i) aluminum trihydrate, (ii) magnesium hydroxide, (iii) monoammonium phosphate, (iv) a halogenated flame retardant, (v) an antimony oxide, (vi) organophosphorus, or (vii) phosphate ester.

3. The cable of claim 1, wherein the extinguishant material comprises a dry powder.

4. The cable of claim 1, wherein the at least one transmission media comprises a plurality of twisted pairs of conductors, and
wherein the at least one component comprises a separator positioned between at least two of the plurality of twisted pairs of conductors.

5. The cable of claim 1, wherein the plurality of cavities comprise at least two cavities positioned at different respective locations along a longitudinal length of the cable.

6. The cable of claim 1, wherein the at least one component comprises a layer that is wrapped at least partially around the at least one transmission media.

7. The cable of claim 1, wherein the first layer comprises a first tape structure and the second layer comprises a second tape structure.

8. The cable of claim 1, wherein the first layer comprises a first tape structure and the second layer comprises electromagnetic shielding material.

9. A cable comprising:
at least one transmission media;
at least one component comprising:
a first extruded portion comprising one or more indentations; and
a second extruded portion formed on the first extruded portion to define a respective cavity corresponding with each of the one or more indentations, wherein the at least one transmission media is not positioned in any of the respective cavities; and
an extinguishant material loosely positioned within each respective cavity.

10. The cable of claim 9, wherein the extinguishant material comprises at least one of (i) aluminum trihydrate, (ii) magnesium hydroxide, (iii) monoammonium phosphate, (iv) a halogenated flame retardant, (v) an antimony oxide, (vi) organophosphorus, or (vii) phosphate ester.

11. The cable of claim 9, wherein the at least one component comprises a shield layer formed around the at least one transmission media, and
wherein the shield layer further comprises electromagnetic shielding material.

12. The cable of claim 9, wherein the at least one component comprises an outer jacket formed around the at least one transmission media.

13. The cable of claim 9, wherein the at least one transmission media comprises at least one optical fiber, and
wherein the at least one component comprises one of (i) a buffer tube formed around the at least one optical fiber or (ii) a tight buffer formed around the at least one optical fiber.

14. The cable of claim 9, wherein the at least one transmission media comprises a plurality of twisted pairs of conductors, and
wherein the at least one component comprises a separator positioned between at least two of the plurality of twisted pairs of conductors.

15. A cable comprising:
a plurality of twisted pairs of individually insulated electrical conductors;
a separator extending lengthwise along a longitudinal length of the cable and positioned between at least two of the plurality of twisted pairs, the separator comprising:
a body configured to maintain the at least two pairs in a predetermined configuration;
at least one cavity formed in the body; and
an extinguishant positioned within the at least one cavity; and
a jacket formed around the plurality of twisted pairs and the separator.

16. The cable of claim 15, wherein the extinguishant comprises at least one of (i) aluminum trihydrate, (ii) magnesium hydroxide, (iii) monoammonium phosphate, (iv) a halogenated flame retardant, (v) an antimony oxide, (vi) organophosphorus, or (vii) phosphate ester.

17. The cable of claim 15, wherein the extinguishant comprises extinguishant material loosely positioned within the at least one cavity.

18. The cable of claim 15, wherein the body comprises:
a first layer, and
a second layer selectively affixed to the first layer in order to define the at least one cavity.

19. The cable of claim 15, wherein the body comprises:
a first extruded portion comprising at least one indentation corresponding to the at least one cavity; and
a second extruded portion formed on the first extruded portion.

20. The cable of claim 15, wherein the at least one cavity comprises a plurality of cavities.

* * * * *